US008181107B2

(12) United States Patent
Melnyk et al.

(10) Patent No.: US 8,181,107 B2
(45) Date of Patent: May 15, 2012

(54) CONTENT ADAPTATION

(75) Inventors: Miguel Melnyk, Champaign, IL (US);
Suresh Bashyam, Sunnyvale, CA (US);
Andrew Penner, Champaign, IL (US);
John Rochon, Champaign, IL (US);
Kapil Dakhane, Sunnyvale, CA (US)

(73) Assignee: Bytemobile, Inc., Santa Clara, CA (US)

( * ) Notice: Subject to any disclaimer, the term of this patent is extended or adjusted under 35 U.S.C. 154(b) by 1151 days.

(21) Appl. No.: 11/636,033

(22) Filed: Dec. 8, 2006

(65) Prior Publication Data

US 2008/0139191 A1   Jun. 12, 2008

(51) Int. Cl.
*G06F 17/00* (2006.01)

(52) U.S. Cl. ....................................................... 715/238

(58) Field of Classification Search .................... 715/238
See application file for complete search history.

(56) References Cited

U.S. PATENT DOCUMENTS

| 5,437,005 | A  | * | 7/1995  | Torres ............................ 715/209 |
| 5,491,785 | A  | * | 2/1996  | Robson et al. ................ 715/210 |
| 6,230,157 | B1 | * | 5/2001  | Malcolm et al. .............. 707/100 |
| 6,983,331 | B1 | * | 1/2006  | Mitchell et al. ............... 709/246 |
| 6,992,687 | B1 | * | 1/2006  | Baird et al. .................... 715/805 |
| 7,055,095 | B1 | * | 5/2006  | Anwar ........................... 715/206 |
| 7,293,281 | B1 | * | 11/2007 | Moran et al. ....................... 726/3 |
| 7,500,188 | B1 | * | 3/2009  | Trapani et al. ................. 715/273 |
| 7,685,260 | B2 | * | 3/2010  | Fukuda et al. ................. 709/219 |
| 2001/0047394 | A1 |   | 11/2001 | Kloba et al. |
| 2002/0059367 | A1 |   | 5/2002  | Romero |
| 2002/0091738 | A1 | * | 7/2002  | Rohrabaugh et al. .......... 707/517 |
| 2002/0103823 | A1 | * | 8/2002  | Jackson et al. .............. 707/501.1 |
| 2002/0116407 | A1 | * | 8/2002  | Negishi et al. ................ 707/203 |
| 2002/0120721 | A1 | * | 8/2002  | Eilers et al. ................... 709/220 |
| 2002/0143826 | A1 | * | 10/2002 | Day et al. ...................... 707/526 |
| 2003/0033448 | A1 | * | 2/2003  | Kieffer ........................... 709/331 |
| 2003/0037021 | A1 | * | 2/2003  | Krothappalli et al. ............ 707/1 |
| 2003/0046318 | A1 | * | 3/2003  | Schohn et al. ................. 707/513 |
| 2003/0069881 | A1 |   | 4/2003  | Huttunen |
| 2003/0088639 | A1 | * | 5/2003  | Lentini et al. ................. 709/217 |
| 2003/0115549 | A1 |   | 6/2003  | Ward |
| 2003/0176996 | A1 | * | 9/2003  | Lecarpentier ...................... 704/7 |
| 2003/0214519 | A1 | * | 11/2003 | Smith et al. .................... 345/660 |

(Continued)

FOREIGN PATENT DOCUMENTS

EP    1 071 024 A2    1/2001

(Continued)

OTHER PUBLICATIONS

Sanders, Javascript Design, p. 10-11 (New Riders, Dec. 12, 2001).*

(Continued)

*Primary Examiner* — Laurie Ries
*Assistant Examiner* — Frank D Mills
(74) *Attorney, Agent, or Firm* — Finnegan, Henderson, Farabow, Garrett & Dunner LLP

(57) ABSTRACT

A system includes a mobile device and an optimization server. The mobile device is capable of transmitting request data that includes a requested webpage and identification data. The optimization server is configured to receive response data that corresponds to the request data from a content server, to adapt the response data based on the identification data, and to transmit the adapted response data to the mobile device.

10 Claims, 11 Drawing Sheets

U.S. PATENT DOCUMENTS

| | | | |
|---|---|---|---|
| 2003/0226110 A1* | 12/2003 | Scheering | 715/513 |
| 2003/0237053 A1 | 12/2003 | Chen et al. | |
| 2004/0049737 A1* | 3/2004 | Simon Hunt et al. | 715/513 |
| 2004/0103371 A1 | 5/2004 | Chen et al. | |
| 2004/0133848 A1 | 7/2004 | Hunt et al. | |
| 2004/0139397 A1* | 7/2004 | Yuan et al. | 715/517 |
| 2004/0148571 A1 | 7/2004 | Lue | |
| 2004/0163046 A1* | 8/2004 | Chu et al. | 715/517 |
| 2004/0205568 A1* | 10/2004 | Breuel et al. | 715/513 |
| 2004/0205650 A1* | 10/2004 | Cheng | 715/530 |
| 2004/0268221 A1* | 12/2004 | Wang | 715/500.1 |
| 2004/0268248 A1* | 12/2004 | Makela | 715/523 |
| 2004/0268249 A1* | 12/2004 | Fennelly et al. | 715/523 |
| 2005/0097458 A1* | 5/2005 | Wilson | 715/517 |
| 2005/0108636 A1* | 5/2005 | Sylthe et al. | 715/525 |
| 2005/0188298 A1* | 8/2005 | Makela | 715/503 |
| 2005/0256836 A1 | 11/2005 | Awamoto et al. | |
| 2006/0007466 A1* | 1/2006 | Ben-Yehuda et al. | 358/1.13 |
| 2006/0031411 A1* | 2/2006 | Gimson et al. | 709/219 |
| 2006/0059462 A1* | 3/2006 | Yamamoto | 717/115 |
| 2006/0095510 A1 | 5/2006 | Rouse et al. | |
| 2006/0173891 A1* | 8/2006 | Berstis et al. | 707/102 |
| 2006/0197782 A1* | 9/2006 | Sellers et al. | 345/660 |
| 2006/0224955 A1* | 10/2006 | Makela | 715/526 |
| 2007/0083810 A1* | 4/2007 | Scott et al. | 715/525 |
| 2007/0150556 A1* | 6/2007 | Fukuda et al. | 709/219 |
| 2007/0268317 A1* | 11/2007 | Banay | 345/660 |
| 2007/0276795 A1* | 11/2007 | Poulsen | 707/2 |
| 2007/0300244 A1* | 12/2007 | Kieffer | 719/331 |
| 2008/0033996 A1* | 2/2008 | Kesari | 707/104.1 |
| 2008/0072139 A1* | 3/2008 | Salinas et al. | 715/238 |
| 2008/0109477 A1* | 5/2008 | Lue | 707/102 |
| 2008/0120393 A1* | 5/2008 | Chen et al. | 709/217 |
| 2008/0155396 A1* | 6/2008 | Dubinko et al. | 715/251 |

FOREIGN PATENT DOCUMENTS

| | | |
|---|---|---|
| WO | WO 00/39666 | 7/2000 |

OTHER PUBLICATIONS

Mohomed et al., Context-Aware Interactive Content Adaptation, p. 42-55 (ACM, MobiSys '06, Jun. 19-22, 2006).*

Hoh et al., Device Personalisation—Where Content Meets Device, p. 67-74 (BT Technology Journal, vol. 21 No. 1, Jan. 2003).*

Goebel et al., Software Architecture for the Adaption of Dialogs and Contents to Different Devices, p. 42-51 (Springer-Verlag, Lecture Notes in Computer Science vol. 2344, 2002).*

Ham, K, et al.. "Wireless-Adaptation of WWW Content Over CDMA", Mobile Multimedia Communications, 1999 (MOMUC '99), pp. 368-372; Nov. 15, 1999.

Bos, K, et al. "HTML and Style Sheets", Standard-Working-Draft, Internet Engineering Task Force (IETF); http: www..w3.org/pub/WWW/TR;Jan. 23, 2006; pp. 1-10.

International Search Report and Written Opinion of the International Searching Authority for International Application No. PCT/US2007/023998, mailed Nov. 27, 2008, 33 pages.

International Search Report and Written Opinion of the International Searching Authority for International Application No. PCT/US2007/023998, mailed Jun. 18, 2009, 23 pages.

* cited by examiner

CONTENT ADAPTATION

BACKGROUND INFORMATION

The Internet allows for vast amounts of information to be communicated over any number of interconnected networks, computers, and network devices. Typically, information or content is located at websites on one or more content servers, and a user can retrieve this content using a user agent, such as a web browser, running on a client device. For example, the user can input a webpage address into the web browser or access a web link, which sends requests to the server to access and provide to the user the content on the respective website. This type of communication is: commonly referred to as "web browsing."

Web browsing is enjoyed by millions of users on the Internet. Because web browsing has become so widespread, many websites provide more complicated, enhanced visual effects and features. These enhanced qualities are generally directed towards a user viewing the website from a typical computer, such as a laptop, PC, etc.

Mobile web browsing has gained some traction because of the increased network speed, improved browsers, more powerful devices, and better pricing plans. But significant challenges still remain for Internet browsing on a mobile phone to become more popular among users. Some end user challenges include the frustration over long download times, the lack of accessibility, the lack of performance, and the lack of usability. For example, it may take over a minute for a full download of www.msn.com from a mobile phone on a typical network without multipart encoding. Accessibility challenges include the inability of WAP 2.0 browsers to render rich HTML content; the lack of plug in support for rich multi-media content; and the lack of support for DHTML websites. Performance challenges include the large latency in wireless networks, the discrepancies between uplink and downlink bandwidth, and TCP limitations. Along with the accessibility and performance issues, usability challenges can include, among other things, attempting to fit a large complicated page onto a small screen. In addition to these challenges to the user, website developers also face challenges such as the lack of standards for defining the device and the browsers capability, and the large test matrix of a myriad device and browser combinations. For mobile web browsing to become more readily operable for the user, these issues must be addressed.

DESCRIPTION OF THE EMBODIMENTS

Reference will now be made in detail to the exemplary embodiments implemented according to the invention, the examples of which are illustrated in the accompanying drawings. Wherever possible, the same reference numbers will be used throughout the drawings to refer to the same or like parts.

Figure 1:
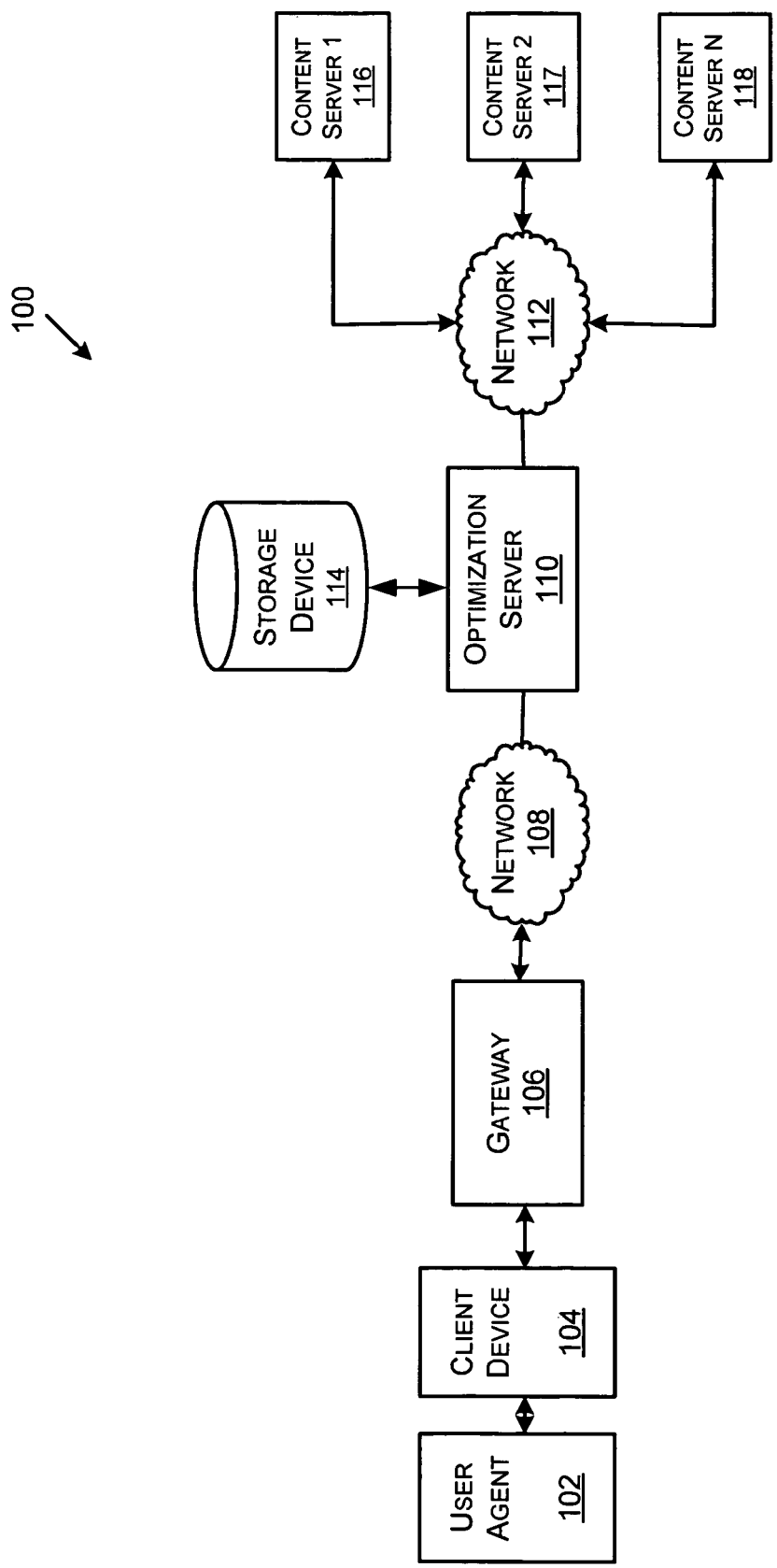
FIG. 1 is a block diagram of an exemplary system.

FIG. 1 is a block diagram of an exemplary system. Exemplary system 100 can be any type of system that transmits data over a network, such as a wireless network, Internet, etc. For example, the exemplary system can include a browser requesting access to content from content servers through the Internet. The exemplary system can include, among other things, a user agent 102, a client device 104, a gateway 106, one or more networks 108, 112, an optimization server 110, a storage device 114, and one or more content servers 116-118.

User agent 102 is a client application used with a network protocol. For example, user agent 102 could be a web browser, a search engine crawler, a screen reader, or a Braille browser, and user agent 102 could be used to access the Internet. User agent 102 can be a software program that transmits request data (e.g., an HTTP/HTTPS/WAP/WAIS/Gopher/RTSP request, etc.) to a web server and receives response data in response to the request data. For example, user agent 102 can send request data to content servers 116-118 for a particular file or object data of a web page by its URL, and the content server of the web page can query the object data in a database and can send back the object data as part of the response data (e.g., HTTP/WAP response data) to the user agent. This process continues until every object in the web page has been downloaded to the user agent.

Client device 104 is a computer program or hardware device that can access remote services. Client device 104 can receive request data from user agent 102, can transmit the request data to the content servers, and can receive response data in response to the request data. For example, client device 104 can be Bytemobile Optimization Client Software. In some embodiments, user agent 102 and client device 104 can be housed in the same device, such as a computer, a PDA, a cell phone, a laptop, or any device accessing the Internet. In some embodiments, client device 104 can be removed and its functionality can be included in user agent 102.

Gateway 106 is a device that converts formatted data provided in one type of network to a particular format required for another type of network. Gateway 106, for example, may be a server, a router, a firewall server, a host, or a proxy server. The gateway 106 has the ability to transform the signals received from client device 104 into signals that network 108 can understand and vice versa. Gateway 106 may be capable of processing audio, video, and T.120 transmissions alone or in any combination, and is capable of full duplex media translations.

Networks 108 and 112 can include any combination of wide area networks (WANs), local area networks (LANs), or wireless networks suitable for networking communication such as Internet communication.

Optimization server (OS) 110 is a server that provides communication between gateway 106 and content servers 116-118. For example, OS 110 could be a Bytemobile Optimization Services Node. OS 110 can optimize performance by enabling significantly faster and more reliable service to customers. OS 110 can include optimization techniques, which are further described below.

Storage device 114 is a device that stores adaptation parameters relating to the specifications of user agent 102 and a device utilizing the user agent 102. In some embodiments, storage device 114 can be included with OS 110, local to OS 110, or remote from OS 110. The stored adaptation parameters can assist OS 110 in determining what kind of optimization techniques are provided to user agent 102 and the device. Storage device 114 can be any type of device that stores data.

Content servers 116-118 are servers that receive the request data from user agent 102, process the request data accordingly, and return the response data back to user agent 102. For example, content servers 116-118 can be a web server, an enterprise server, or any other type of server. Content servers 116-118 can be a computer or a computer program responsible for accepting HTTP requests from the user agent and serving the user agents with web pages.

Figure 2:
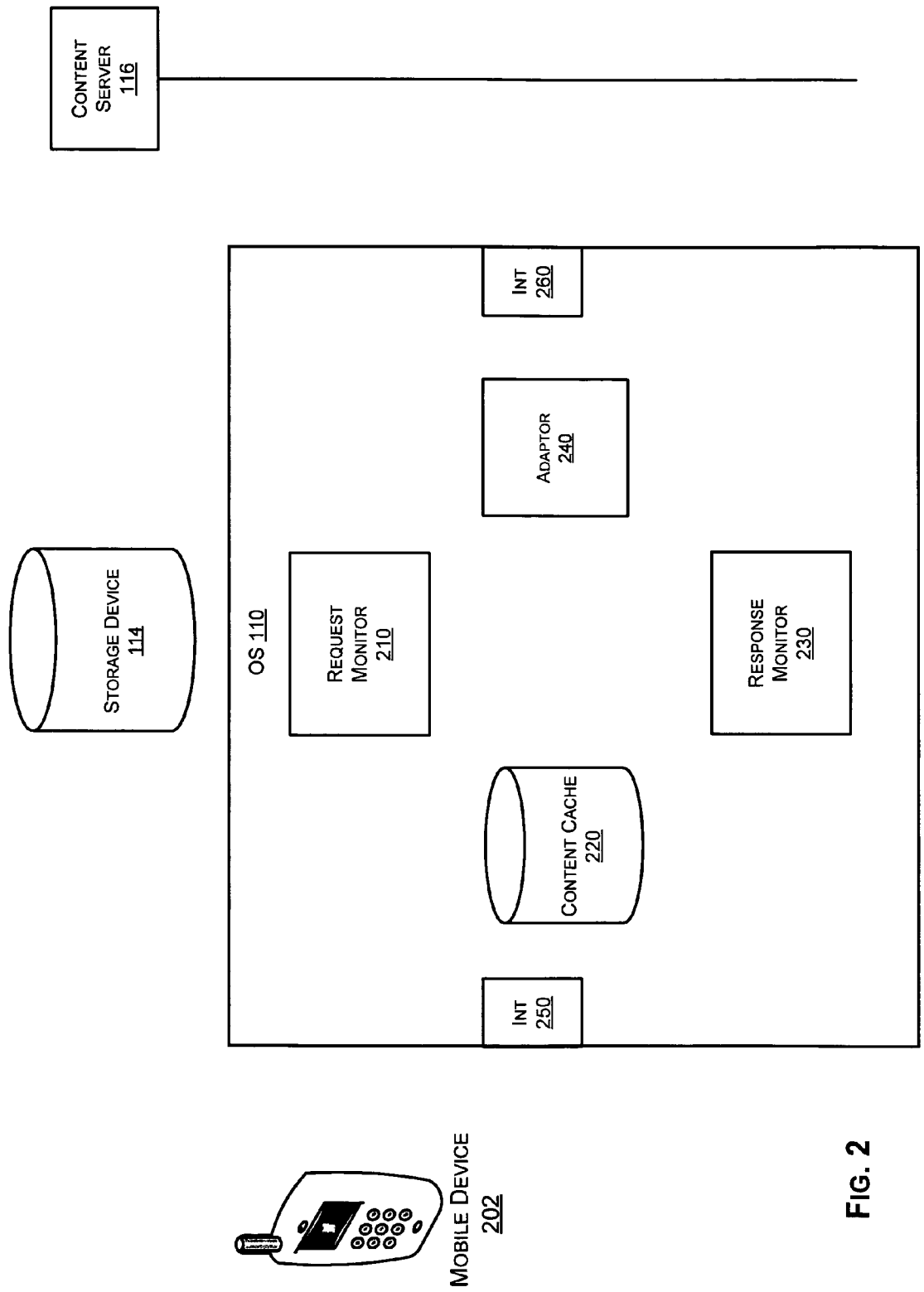
FIG. 2 is a block diagram illustrating an embodiment of the exemplary system of FIG. 1.

FIG. 2 is a block diagram illustrating an embodiment of the exemplary system of FIG. 1. Mobile device 202 is a wireless device that can include, among other things, user agent 102 and/or client device 104. OS 110 may include, among other things, a request monitor 210, a content cache 220, a response monitor 230, an adaptor 240, and interfaces 250, 260. As stated above, in some embodiments, storage device 114 can be located within, local to, or remote from OS 110.

Request monitor 210 can be a software program or a hardware device that receives or intercepts the request data, such as an HTTP request for a specific URL, from mobile device 202. Request monitor 210 has the ability to extract identification data, from the request data and to provide the identification data to the storage device 114 in exchange for adaptation parameters, which can be provided to adaptor 240 for future processing. Identification data can include, among other things, the type of user agent and the type mobile device, and the adaptation parameters can include data describing the properties of the user agent and mobile device, such as screen size, etc. Request monitor 210 can also communicate with the content cache 220 to provide stored adapted response data (e.g., sub-pages) to the mobile device 202. Further, request monitor 210 can transmit the request data to content server 116 if the request data does not request the adapted response data.

Response monitor 230 can be a software program or a hardware device that receives response data from content server 116. After receiving the response data, response monitor 230 provides the content data to adaptor 240, which adapts the response data for mobile device 202. Depending upon whether the response data is to be adapted for the mobile device, response monitor 230 can provide either the response data or the adapted response data to mobile device 202.

Adaptor 240 can be a software program or a hardware device that receives the response data from response monitor 230 and adapts the response data in accordance with the adaptation parameters received from request monitor 210. This adaptation process will be further described below. Adaptor 240 can provide the adapted response data to response monitor 230 and/or content cache 220. In some embodiments, the adapted response data includes a main adapted sub-page and subsequent adapted sub-pages. The main adapted sub-page could be provided to the response monitor 230, which provides it to mobile device 202 for downloading and displaying. These sub-pages could be stored at content cache 220 for future referencing.

Content cache 220 is a device that stores adapted response data (e.g., adapted sub-pages) for future referencing. Content cache 220 can provide this adapted response data to request monitor 210, which can provide the adapted response data to mobile device 202 without having to re-request response data from content server 116. Content cache 220 can also provide adapted response data to response monitor 230, which transmits this data to mobile device 202. In some embodiments, content cache 220 can directly provide the adapted response data to mobile device 202.

Interfaces 250 and 260 are software programs or hardware devices that communicatively couple OS 110 with mobile device 202 and content server 116 through wired or wireless communication means. Each interface has the ability to communicate with the elements of OS 110, translate the communication so that the communication means can utilize the data, and transmit the translated communication across the corresponding communication means. In some embodiments, interfaces 250 and 260 can include encryption means and/or decryption means to encrypt communications leaving from and decrypt communications coming into OS 110.

Figure 3:
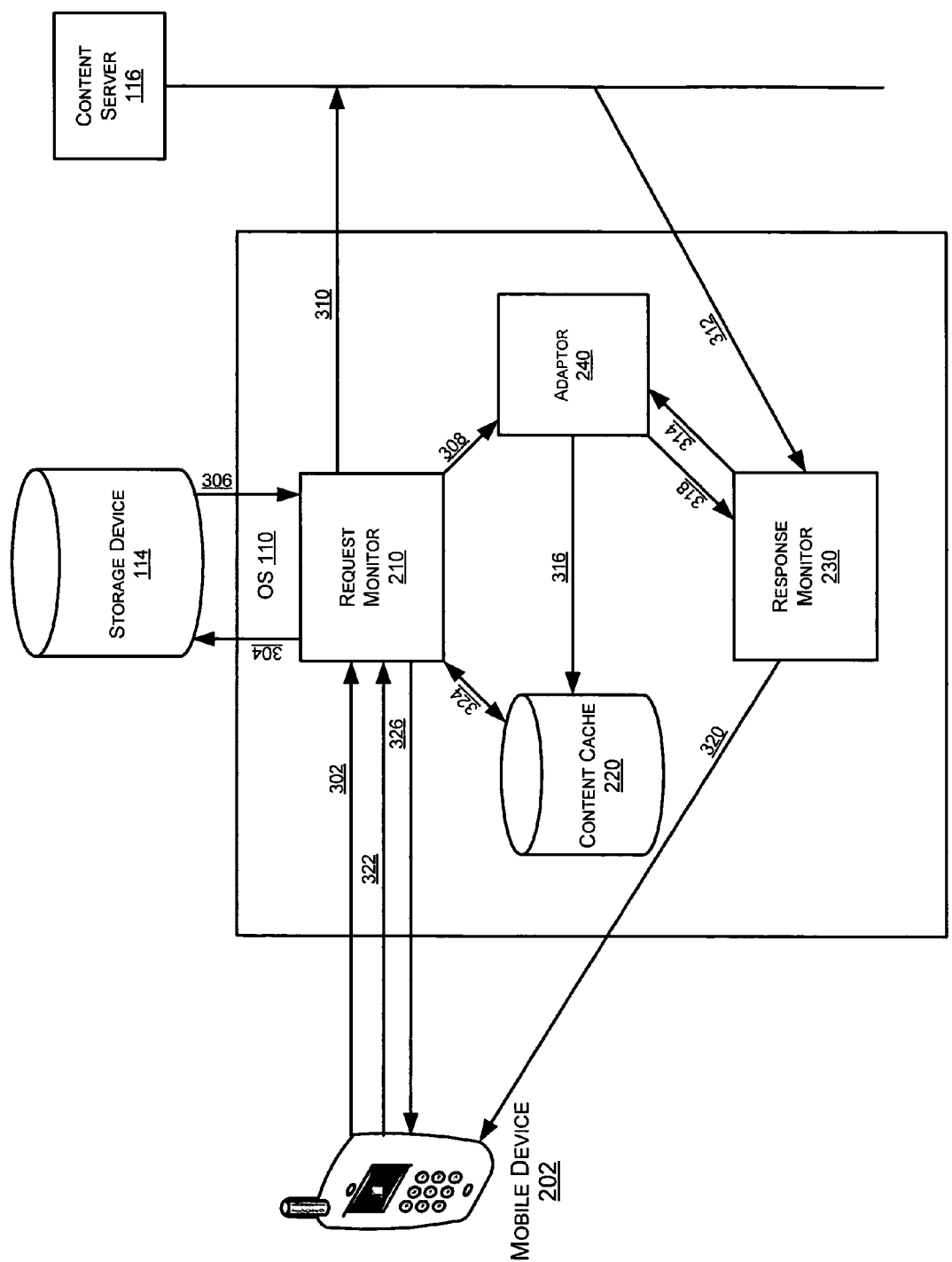
FIG. 3 is a functional diagram illustrating an exemplary communication flow for the exemplary system of FIG. 2.

FIG. 3 is a functional diagram illustrating an exemplary communication flow in the exemplary system of FIG. 2. It is assumed for the purposes of explaining this exemplary communication flow that the request data corresponds to a request for a URL and that content cache 220 has not stored any adapted response data corresponding to the requested URL. Further, while the exemplary communication flow illustrates OS 110 providing the content adaptation, in some embodiments, the user agent may include additional components to locally assist the content adaptation process by transferring or further translating the adapted information.

The user inputs a URL into a user agent of the mobile device 202. Mobile device 202 then transmits (302) the request data to OS 110. The request data can include, among other things, the requested URL and identification data identifying the mobile device and the type of user agent on the mobile device. The request data can be directed explicitly to a gateway or proxy and then to OS 110, or it can be directed to content server 116 and the request can be intercepted transparently by an inline proxy or gateway.

Request monitor 210 extracts the identification data from the request data and then transmits (304) the identification data to storage device 114. Responsive to the identification data, storage device 114 returns (306) adaptation parameters to request monitor 210. In some embodiments, the adaptation parameters may include, among other things, the following data:

| Adaptation parameters | Meaning/Use |
| --- | --- |
| JavaScript support | whether the device supports JavaScript |
| Screen width | usable screen width in pixels |
| Screen height | usable screen height in pixels |
| Markup language | usually XHTML or XHTML/MP |
| Color depth | bit-depth used for image transcoding/byte-reduction |
| Maximum bytes per page | devices generally have problems when the page size exceeds this limit |
| Maximum images per page | some devices have problems when the number of images exceeds this limit |
| Maximum links per page | few devices have problems when the number of links exceeds this limit |
| Font-size support | whether variable font-sizes can be used |
| Font-family support | whether variable font-families can be used |
| Preferred font-family | default font-family of the device |
| Minimum font size | the smallest size where differences in font size are no longer rendered |
| Maximum font size | the largest size where differences in font size are no longer rendered |

-continued

| Adaptation parameters | Meaning/Use |
|---|---|
| Number of available font sizes | how many different font sizes can be specified between min and max where each font size is rendered differently |
| HTML table support | whether the browser can render tables |
| Previous sub-page soft-key | The key number in the handset keypad to link to the "Previous sub-page" action |
| Next sub-page soft-key | The key number in the handset keypad to link to the "Next sub-page" action |
| Top of page soft-key | The key number in the handset keypad to link to the "Top of the page" action |
| Bottom of page soft-key | The key number in the handset keypad to link to the "bottom of page" action |
| Referring page soft-key | The key number in the handset keypad to link to the "Previously viewed site" action |
| Maximum URL length | Some devices cannot handle long URLs |
| Maximum HTML title length | Used to chop title for browser which don't manage long titles properly |
| User Agent | Used for device-specific adaptations |

Upon receiving the adaptation parameters, request monitor 210 can forward (308) the adaptation parameters to adaptor 240 for future referencing. In some embodiments, adaptor 240 receives the identification data from request monitor 210, stores it, and exchanges the identification data for the adaptation parameters located in storage device 114.

After communicating with adaptor 240, request monitor 210 forwards (310) the request data to content server 116. Subsequently, content server 116 provides (312) response data (e.g., HTTP response), associated with the request data, to response monitor 230 of OS 110. The response data can include, among other things, an HTML document, a Cascaded Style Sheet Files, and one or more JavaScript files, all of which constitute the requested webpage. These web pages include a collection of nested HTML elements, represented by tags. The OS 110 can utilize a parser to create a data structure that stores the tags found in the HTML document for accessing and manipulating each individual element in the HTML document. Because HTML tags can be nested, this data structure is likely to be in the form of a tree.

The Document Object Model (DOM) interface is a standard method to access this tree-like data structure, commonly referred to as the DOM tree of the HTML document, and represents the requested web page. The embodiments described herein generally assume a DOM tree as the input, but it would be readily appreciated by one of ordinary skill in the art that any other type of data structure representing a web page can be used. Further, it would be readily appreciated by one of ordinary skill in the art that any other method for accessing and traversing the elements in the webpage can be used.

The following sample HTML document illustrates some key concepts:

```
<html>
    <head>
        <title> The Document Title </title>
    </head>
    <body>
        <div>
            <h1> A section header </h1>
            <p> a paragraph</p>
        </div>
        <span> <p> Another Paragraph </p> </span>
    </body>.
</html>
```

Figure 4A:
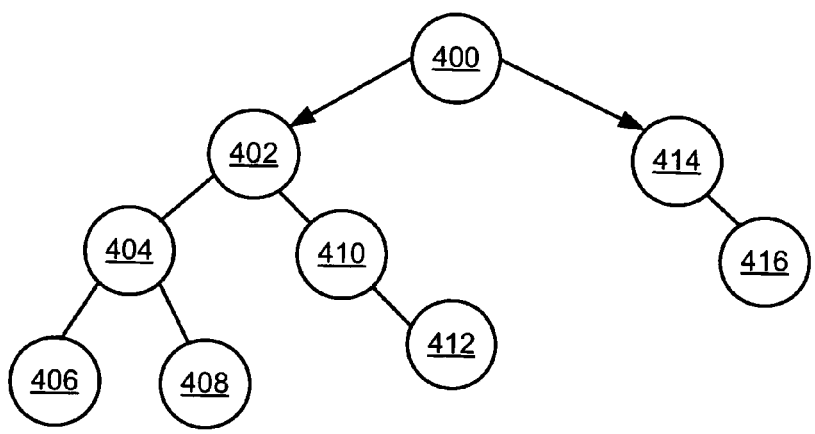
FIGS. 4A & 4B illustrate a Document Object Model tree structure and a corresponding webpage.
Figure 4B:
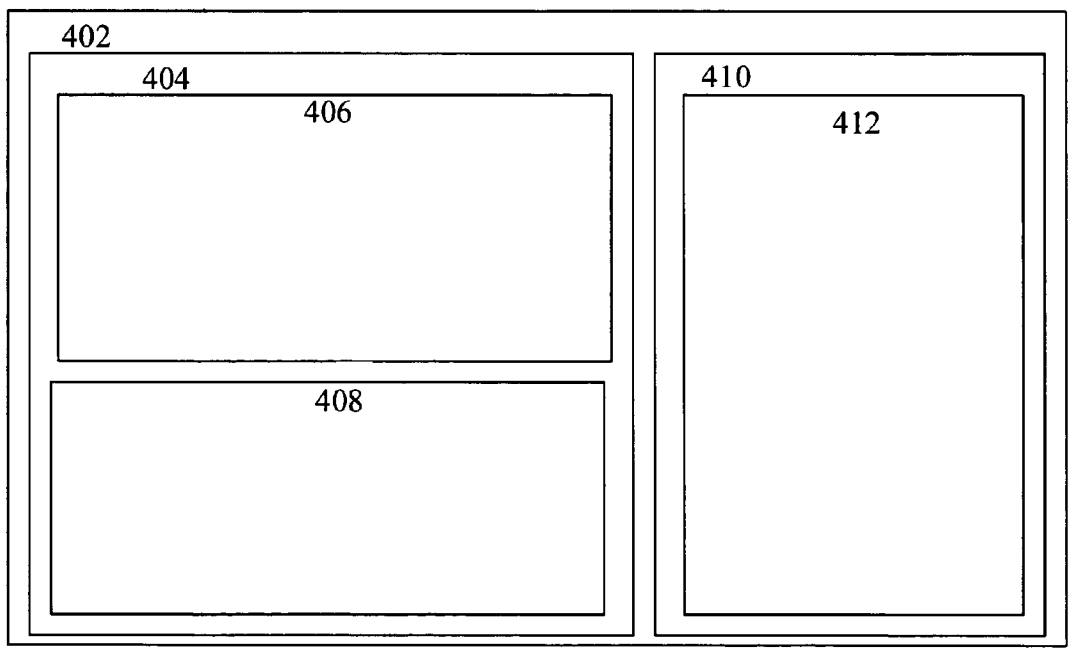

For example, FIG. 4A illustrates a very simplified DOM tree structure that represents the sample HTML document. In this DOM tree structure, node 400 is the root node and is also the parent node of child nodes 402, 414. An exemplary embodiment could be that root node 400 has an <HTML> tag, which identifies root node 400 as being written in HTML. Further, node 402 includes a <Body> tag and node 414 includes a <Head> tag. The <Body> tag encloses the actual, visible content of the HTML document, and can be used to define style properties that apply to the entire document, such as the background image, the text, the link, and the visited link colors. The <Head> tag encloses special tags bearing information about the document itself. Node 414 has a child node 416, a descendent of both node 400 and node 414. For this particular example, node 416 includes a <Title> tag, which identifies the node having the title of the page at the head of the document. Node 402 links to nodes 404, 410, which are both descendents of node 402 and 400. In this example, node 404 is a <div> tag that encloses a header <h1> tag (node 406) and a paragraph <p> tag (node 408) while node 410 is a <span> tag used to apply style to the "another paragraph" <p> tag in node 412. Ultimately, each node in the DOM tree may be displayed, or rendered for a computer screen by using the style information provided in the webpage's CSS files. As a result of the rendering process, each node in the DOM tree can have geometric and style properties. For example, the rendering process of the data tree structure provided in FIG. 4A could produce the exemplary webpage provided in FIG. 4B. FIG. 4B provides the corresponding reference numbers that relate to the data tree structure provided in FIG. 4A and the sample HTML document provided above.

Referring back to FIG. 3, if adaptation is required, response monitor 230 provides (314) the response data to adaptor 240, which adapts the response data for mobile device 202 based on the adaptation parameters provided in step 308. Adaptor 240 traverses the DOM tree structure, to create adapted request data that would maintain the look and feel of the originally requested webpage. This adaptation can also include content styling, JavaScript processing, small screen adaptation, and paginating the response data, wherein paginating includes, among other things, separating the request data into several sub-pages because the screen and/or user agent on the mobile device may not be able to accommodate the entire webpage. For example, if a user requests cnn.com, the entire cnn.com webpage could not be displayed on the phone because the download would take too long and/or the mobile device's memory could not be sufficient to accommodate all of the information. Paginating would allow cnn.com to be broken up into several sub-pages while still maintaining the look and feel of the original page.

If the adaptor creates several sub-pages, the adaptor can determine the adapted main sub-page and the subsequent sub-pages. For example, referring back to the cnn.com example, the breaking news section of cnn.com could be the adapted main sub-page while the latest news tab box, the menu items, etc. could all be in the same or different sub-pages. As will be explained later, the sub-pages can include header and footer data that link to prior and subsequent sub-pages.

By creating these sub-pages, adaptor 240 assists mobile device 202 because mobile device 202 does not have to download the entire webpage. If the adapted response data includes one or more subsequent sub-pages, adaptor 240 can forward (316) these one or more subsequent sub-pages to content cache 220 to be stored for future referencing. If the sub-page is the adapted main sub-page, adaptor can forward (318) the adapted main sub-page to response monitor 230, which forwards (320) the adapted main sub-page to mobile device 202 for downloading and displaying. In some embodiments, adaptor 240 can forward the adapted main sub-page to response monitor 230 at step 318 prior to forwarding the subsequent sub-pages to content cache 220 at step 316. Further, in some embodiments, adaptor 240 can bypass forwarding the adapted main sub-page to response monitor 230 and can directly forward it to the mobile device 202 itself.

The user can then view the adapted main sub-page at mobile device 202. If preferring to view a subsequent sub-page, a user can request this sub-page by linking to it through a footer on the bottom of the downloaded main sub-page. Then, mobile device transmits (322) the request data, which includes the request for the subsequent sub-page, to OS 110.

Request monitor 210 receives the request data and analyzes it to determine whether the request data includes a request for new content data or for another subsequent sub-page. In this particular case, request monitor 210 determines that the request is for another sub-page. Because of this determination, request monitor 210 communicates (324) the request to content cache 220 for the requested adapted sub-page. Upon receiving the adapted sub-page, request monitor 210 can forward (326) it to mobile device 202 for downloading. In some embodiments, one of ordinary skill in the art would appreciate that content cache 220 can forward the cached adapted sub-page directly to mobile device 202.

Figure 5:
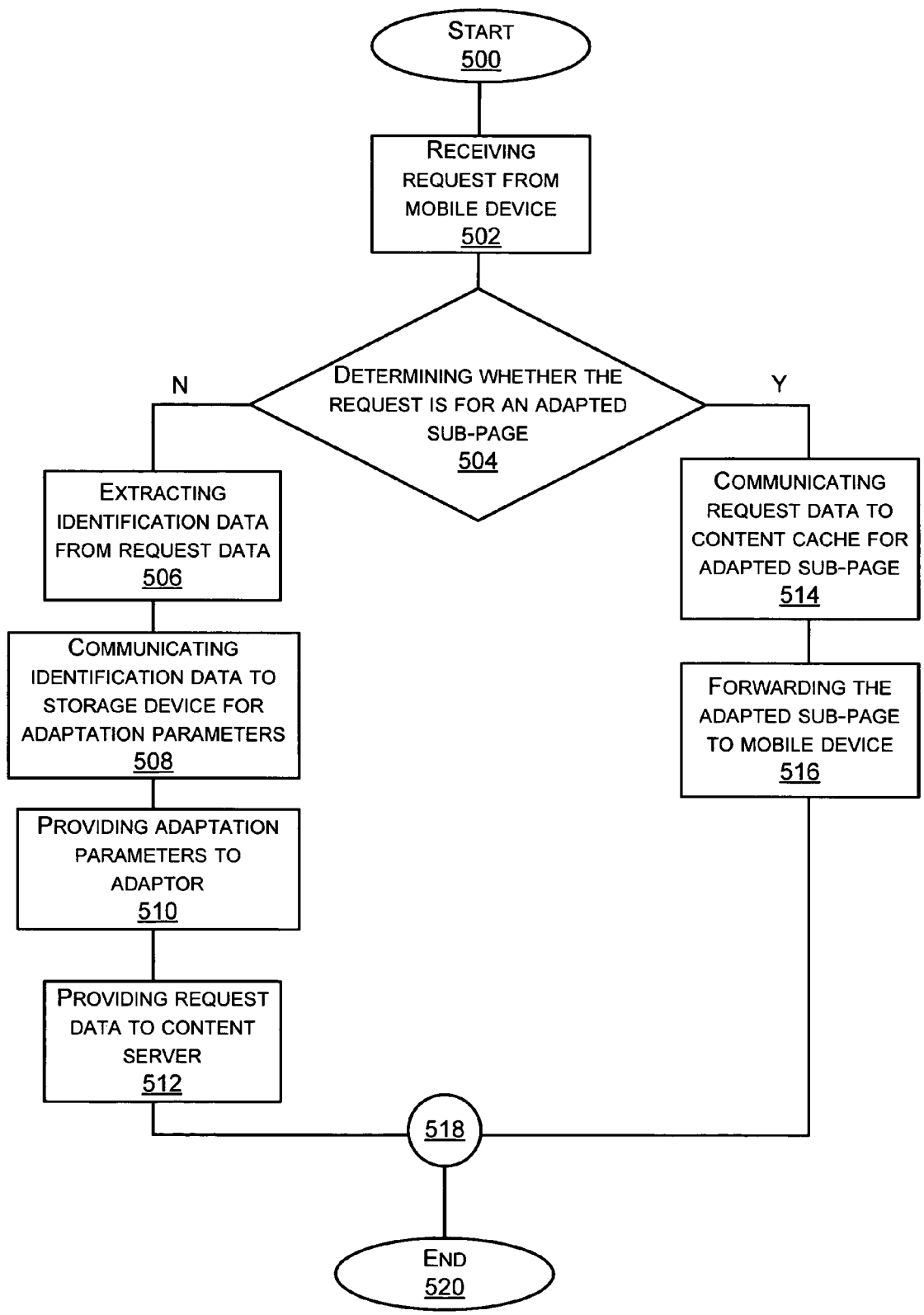
FIG. 5 is a flowchart representing the steps of an exemplary method for processing request data.

FIG. 5 is a flowchart representing an exemplary method for processing request data. It will be readily appreciated by one of ordinary skill in the art that the illustrated procedure can be altered to delete steps or further include additional steps. After initial start step 500, an OS receives (502) request data from a mobile device.

After receiving the request data from mobile device, the OS determines (504) whether the request is for an adapted sub-page. If so, the OS communicates (514) the request data to the content cache for the particular adapted sub-page corresponding to the request data and then forwards (516) the particular sub-page to the mobile device for downloading and displaying. After the forwarding, the method can proceed to connector 518 and then end (520).

On the other hand, if the request data does not correspond to a request for an adapted sub-page, the request data corresponds to a request for content data (e.g., HTTP content) resulting in the OS extracting (506) identification data from the request data. The identification data provides a sequence of alphanumeric symbols that include data about the mobile device type and the user agent type. The OS communicates (508) the identification device to a storage device in exchange for adaptation parameters (e.g., the adaptation parameters provided in the chart above), which assist the OS in determining how to adapt the content data for the requesting mobile device. Upon receiving the adaptation parameters, the OS can provide (510) the adaptation parameters to the adaptor for future processing.

The OS can then transmit (512) the request data to a content server where the content server transmits response data to the OS; the response data including content data corresponding to the request. In some embodiments, the OS can add additional parameters to the request data to ensure that the content server will reply with a webpage. In some embodiments, transmission step 512 can be located between extraction step 506 and communication step 508. After the transmission, the method can proceed to connector 518 and then end (520).

Figure 6:
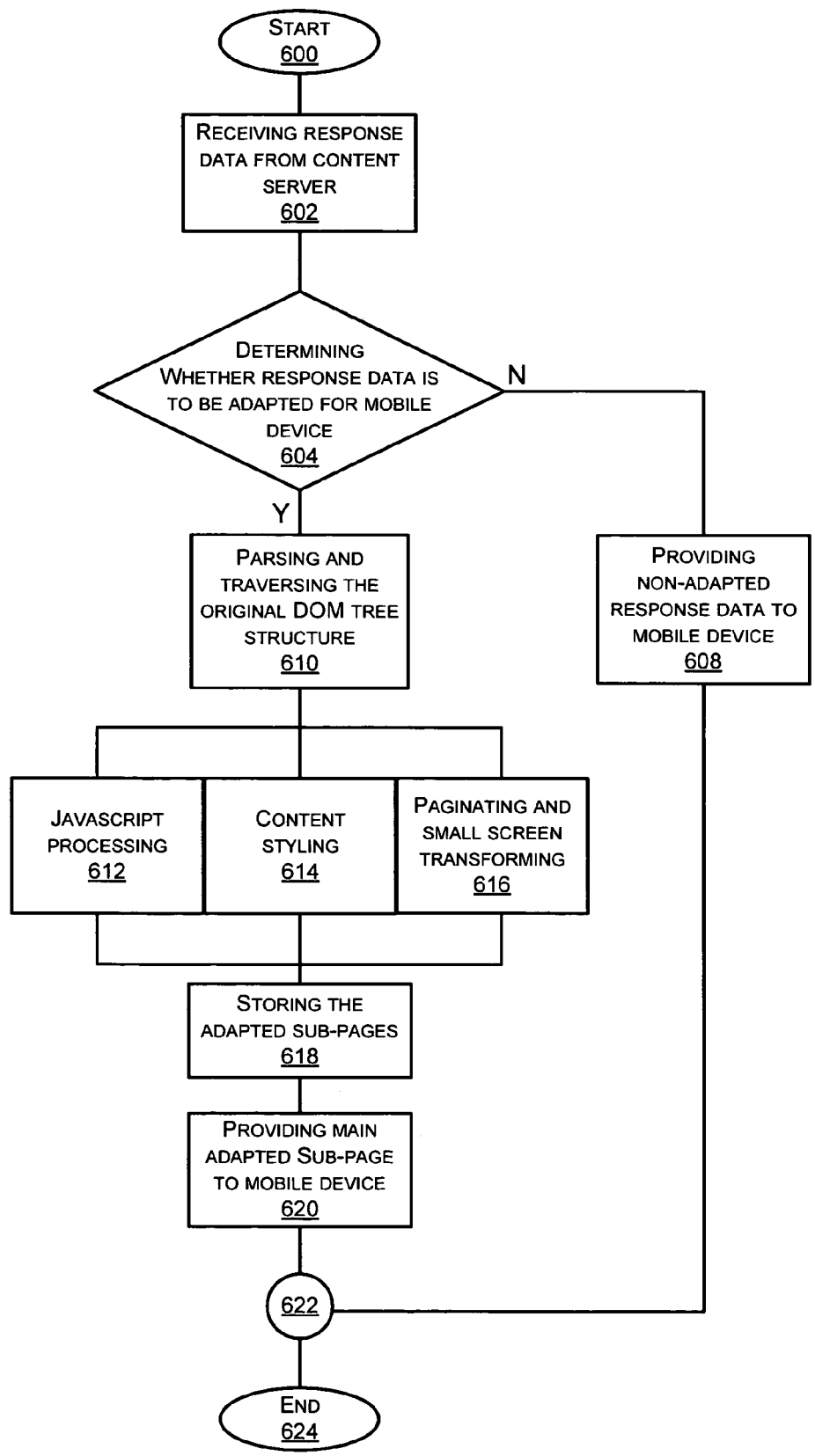
FIG. 6 is a flowchart representing the steps of an exemplary method for processing response data.

FIG. 6 is a flowchart representing an exemplary method for processing response data. It will be readily appreciated by one of ordinary skill in the art that the illustrated procedure can be altered to delete steps or further include additional steps. After initial start step 600, an OS receives (602) response data from a content server.

After receiving the response data, the OS determines (604) whether the response data is to be adapted for the mobile device. For example, some websites, such as Google, are mobile-aware, and provide a response already adjusted specifically for mobile devices and hence, may not need the adaptation process. In some embodiments, mobile-aware response data may still require adapting by the OS. If the request data is not to be adapted, the OS can transmit (608) the non-adapted response data to the mobile device for downloading. After the transmission, the method can proceed to connector 622 and then end (624).

On the other hand, if the response data is to be adapted for the mobile device, the OS parses and traverses (610) an original DOM tree structure of the response data (e.g. HTTP response data). As a result of the parsing, the OS can provide a DOM tree that can be traversed to perform at least one of the following for adaptation: JavaScript processing (612), content styling (614), and paginating and small screen transforming (616), which will be further described in FIGS. 7, 8, & 9, respectively. These adaptation processes can work together or operate as a single standalone process. These adaptation processes can alter a webpage provided by the response data to be broken down into several sub-pages, which can include a first adapted main page and/or one or more subsequent adapted sub-pages. The OS caches (618) these one or more adapted sub-pages for future referencing and provides (620) the adapted main adapted page to the mobile device for downloading. If the user at the mobile device requests one of these adapted sub-pages, the OS can provide them to the mobile device without having to re-request the data from the content server. In some embodiments, where only one main adapted page was created from the original web-page, the method can bypass storage step 618. After the providing step, the method proceeds to connector 622 and then ends (624).

Figure 7:
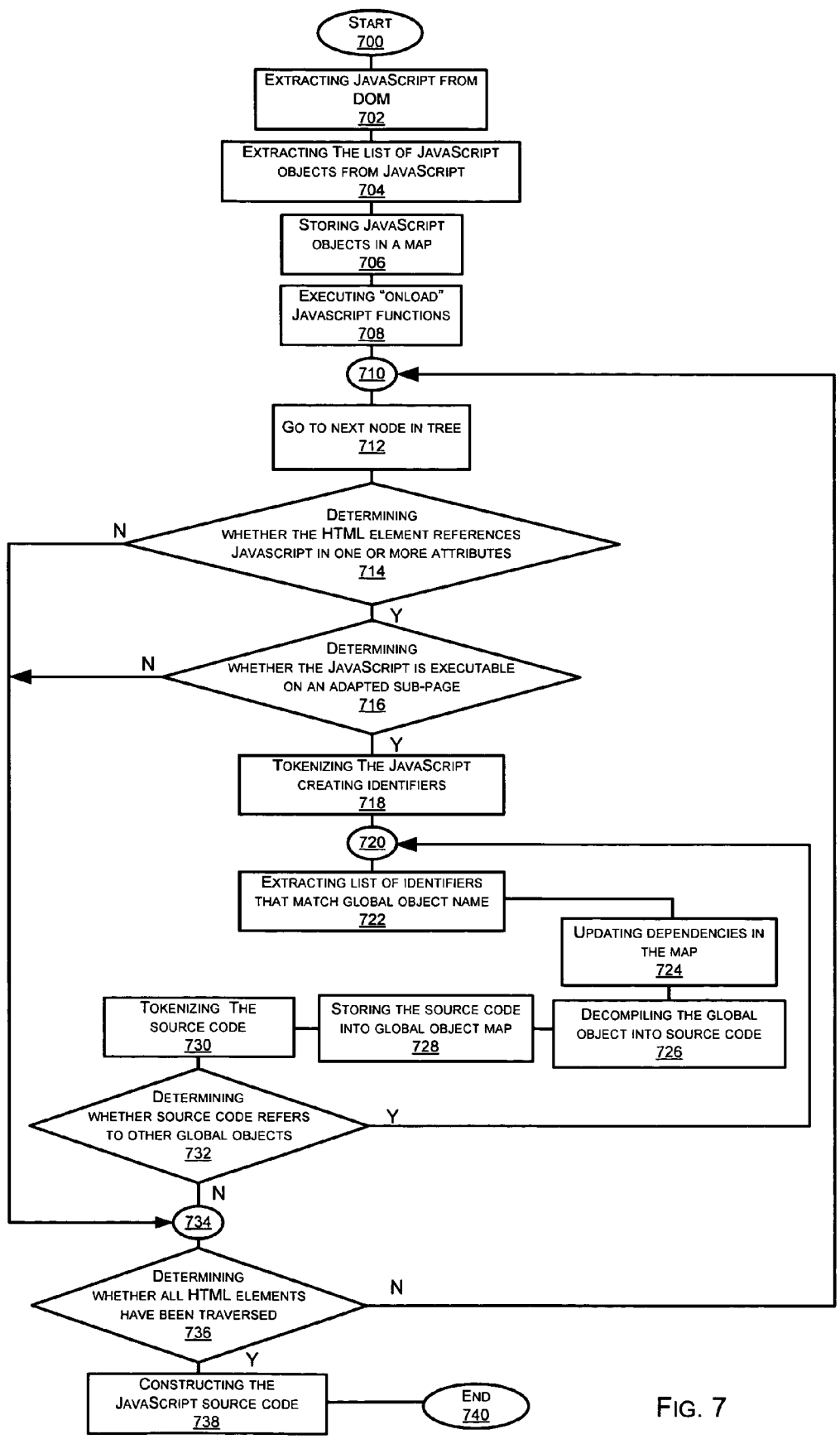
FIG. 7 is a flowchart representing the steps of an exemplary method for processing JavaScript coding.

FIG. 7 is a flowchart representing an exemplary method for processing JavaScript coding. This particular example is concerned with sending JavaScript code and its relevant execution context state information in the adapted sub-page(s) to retain key JavaScript functionality in the adapted sub-page to be provided to the mobile device. This exemplary method effectively provides a "snapshot" and transfers the execution context to the mobile device browser. In this example, JavaScript functionality considered critical relates to the animation and processing of HTML forms and tab boxes. This exemplary method can be extended to preserve other types of functionality. It will be readily appreciated by one of ordinary skill in the art that the illustrated procedure can be altered to delete steps or further include additional steps or functionality. It is assumed for purposes of this method that upon receiving the response data, an OS creates a JavaScript Engine to prepare the JavaScript Execution Context according to Standard JavaScript Specifications, summarized herein at steps 702 to 708.

After initial start step 700, the OS extracts (702) all JavaScript code and references from the original DOM tree structure and any related JavaScript files to build the JavaScript Execution Context (JSContext). The JSContext provides a list of all JavaScript objects defined in the global scope of the requested web page. This list includes objects of user-defined type, objects of built-in type (data, string, etc.), native objects exposed to JavaScript (document, window, etc.), and special objects, such as functions. Then, a JSProcessor extracts (704) the list of JavaScript objects from the JSContext and stores (706) them as keys in a global object map. In some embodiments, native objects are not included in the global object map because these objects can be provided by the user agent's JavaScript implementation. Once the web page is fully loaded and the JS execution context (JSContext) is built, the JSProcessor executes (708) all "onload" JavaScript functions. Onload JavaScript functions perform additional downloads, initialization, and formatting of the webpage. After onload script execution, the web page reaches a static state and usually waits for user interaction.

Then, the OS can begin traversing the DOM tree structure by traversing (712) the next non-traversed node (e.g., first designated node). During the DOM tree traversal, the OS examines each DOM node, which represents an HTML element, to determine whether it references JavaScript objects, and if so, whether those JavaScript objects will be needed in the adapted page to retain desired functionality. The OS determines (714) whether the current HTML element node in the DOM tree structure being visited references JavaScript in one or more of its attributes. For example, a node meeting this first condition can include an anchor tag, with an <href> attribute, containing a JavaScript function call and a select tag with an onchange attribute containing actual JavaScript. If the attributes do not reference JavaScript, the method proceeds to connector 734 and the method further, if needed, traverses the next node within the DOM tree structure.

On the other hand, if the attributes refer to JavaScript, the OS determines (716) whether the JavaScript object(s), referenced by this HTML element node, are necessary (and can be executed) in the resulting adapted sub-page to retain the desired functionality. This determination involves the OS determining whether at least one of the following can be satisfied: this DOM node is located in a DOM sub-tree marked for direct copy (e.g., as a result of a tab box preservation technique further described below); this DOM node is a descendant of a form node; this DOM node is form-related even though it may not be inside a form (select, input, etc.); and this DOM node includes any other criteria related beyond tab-box and form processing (if used as an extension of this exemplary method). If none of these conditions are met, the method proceeds to connector 734 and the method, if needed, further traverses the DOM tree structure. Otherwise, if at least one of these conditions is met, then the JavaScript object(s) should be provided in the adapted page, and this object, as well as all the objects referenced during its execution, should be extracted from the global map and sent in the adapted page.

For this purpose, the OS can build an object dependency graph, which identifies the relationship of the current object to other objects in the global map, during the DOM tree traversal. Steps 718 to 732 refer to building this dependency graph and extracting the JavaScript code to be included in the adapted sub-page(s). These steps are exemplary and may vary in different embodiments to achieve the objective of retrieving JavaScript code required to continue the execution in the adapted page. The dependency graph in this case is implemented as a set (a type of data structure). In addition, the "class" and "id" attributes (if any) of this HTML element are retained in the adapted page.

Next, the OS parses the JavaScript found in the attribute value for any reference to objects in the global map. To begin the parsing, the OS tokenizes (718) the JavaScript code (e.g., by using the JavaScript Engine's lexical scanner) into a list of identifiers. After the tokenization, the OS extracts (722) the identifiers matching the JavaScript object in the global object map. The identifiers that match a global object name are added (724) to the current DOM node's dependency set, which stores global object names that this JavaScript depends upon. The OS decompiles (726) the global object into source code, which provides a snapshot of the global object at this instant in time. The OS then stores (728) this source code in the global object map at an entry corresponding to the global object's name. Next, the OS tokenizes (730) this source code to determine if it references other global objects by looking up the identifier tokens in the global object map.

After tokenizing this new fragment of source code, the OS determines (732) whether the source code references other global objects by looking up identifiers in the global object map. If so, the process is iterated by proceeding to connector 720 until no more dependencies are found. After decompiling and tokenizing a global object, any dependencies found during the recursive dependency search are cached in the object's dependence set. If an object, whose dependencies were already processed, is queried again during a subsequent recursive dependency search, a cached dependence set is used, avoiding the re-processing. The following example illustrates dependency caching. Suppose there are two HTML elements in the original document and the objects in the left column are defined in the global scope of this document as well.

| Global Object | Dependence Sets After HTML Element 1 | Dependence Set After HTML Element 2 |
|---|---|---|
| var x = 5 | | |
| var y = x + 10 | X | x (cache hit) |
| bar( ) { alert(y − 2) } | | x, y |
| foo( ) { bar( ) } | | bar, x, y |

HTML Element 1: <input onmouseover='alert(y)'>
HTML Element 2: <select onchange='foo( )'>

Notice that the 'alert' identifier would be after decompiling and tokenizing 'bar.' The 'alert' function (object) is provided by the native implementation. Thus, in some embodiments, this non-native object is not included in the dependency sets because it is assumed that the target device will provide this object.

This example also illustrates the concept of taking a snapshot of the execution context. For example, variable X holds the value 5. To continue the execution in the target device, the current value of x will be needed for the JavaScript application to work properly. The de-compilation step at step 726 can provide JavaScript code that would set the variable to the value it had at snapshot time. If determination step 732 determines that the source code refers to other global objects on the map, the method proceeds to connector 720 for further decompiling, storing, and tokenizing the remaining objects.

On the other hand, if the source code does not refer to other objects in the global object map, the OS determines (736) whether all DOM nodes have been traversed in the original DOM tree structure. If not, the method proceeds with the traversal of the original DOM tree by advancing to connector 708 and the next DOM node is traversed.

On the other hand, if the traversal has reached the root node, the OS constructs (738) JavaScript source code. This construction can occur during a serialization function (provided in FIG. 9) used for preparing the final HTML code to be sent, managing the dependency sets for each HTML element in the DOM tree structure and merging them (eliminating duplicates between DOM sub-trees) as the DOM tree representing a sub-page is traversed bottom-up. Serialization is performed in several bottom-up traversals (one for each identified Content Section), and once these traversals reach the root node, the merged dependency graph represents all global objects on which the entire DOM tree is dependent. Constructing the adapted source code involves querying each name in the merged dependency set provided in the root DOM node of each content section. The source code for each object (which has already been stored for these objects) is returned and appended to the sub-page being prepared for output to mobile device for all the content sections included in the sub-page (the appending is provided in FIG. 9 at step 916). The resulting source code for all required objects can compile into a state identical to the state of the original document after onload scripts have been executed—without any of the original onload scripts present in the resulting document—resulting in a transfer of the execution context to the mobile device. After constructing the final JavaScript code, the method can end 740.

Figure 8:
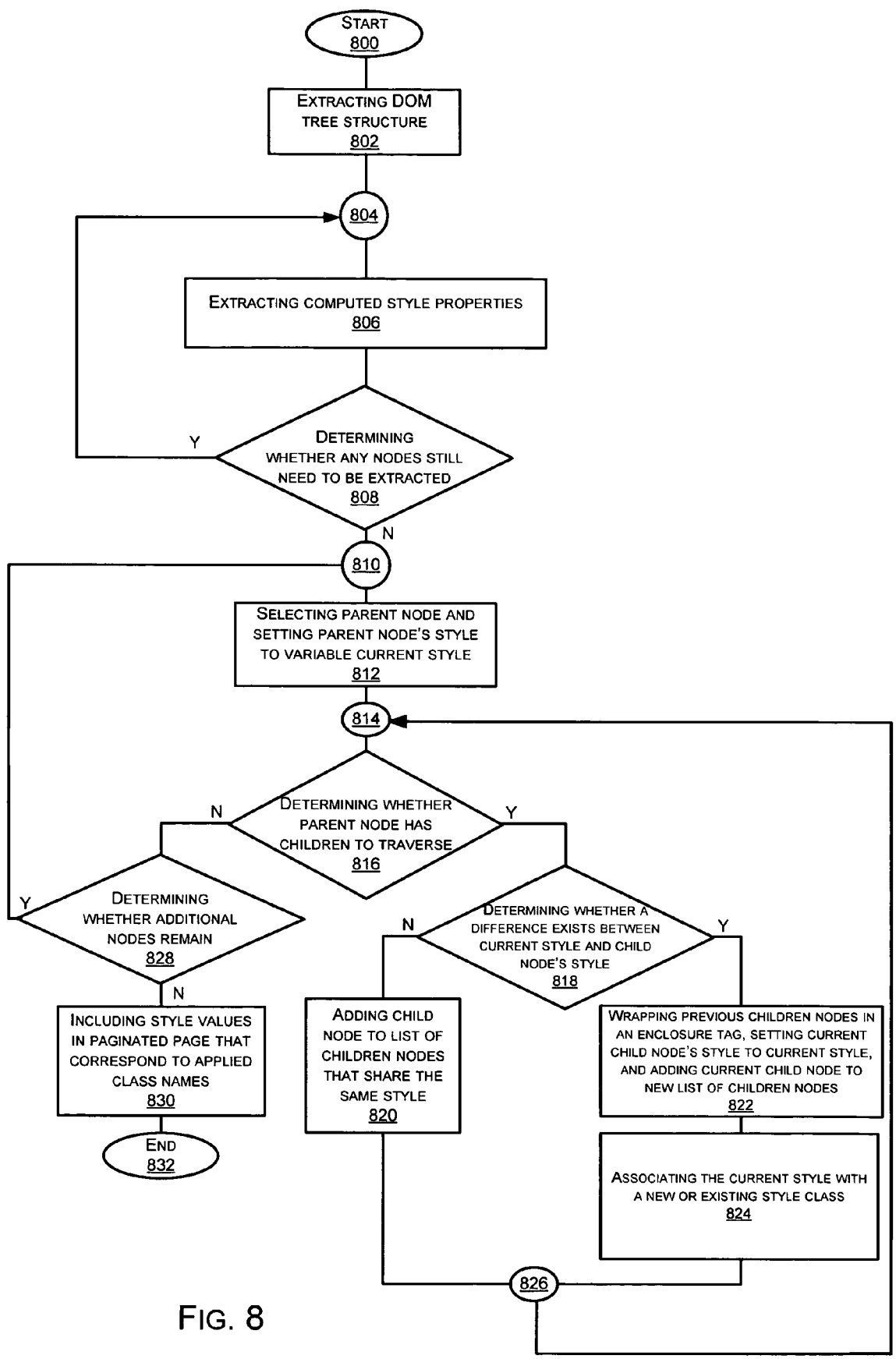
FIG. 8 is a flowchart representing the steps of an exemplary method for providing content styling.

FIG. 8 is a flowchart representing an exemplary method for content styling. It will be readily appreciated by one of ordinary skill in the art that the illustrated procedure can be altered to delete steps or further include additional steps. Providing this content styling process to the resulting small-screen adapted content structures helps an OS significantly reduce the bytes of Cascading Style Sheet (CSS) information while preserving the original look and feel of the original webpage. Of the numerous CSS properties that can be applied to an HTML tag of the DOM tree structure, this method defines a subset of essential style properties affecting the rendering and displaying of HTML elements to retain the look and feel of the original content in the small-screen adapted content. For example, the essential properties may include, among other things, the following:

font-style—The font-style property sets the style of a font (italic, oblique).
font-variant—The font-variant property is used to display text in a small-caps font, which means that all the lower case letters are converted to uppercase letters, but all the letters in the small-caps font have a smaller font-size compared to the rest of the text.
font-size—The font-size property sets the size of a font.
font-weight—The font-weight property sets how thick or thin characters in text should be displayed (often used to bold characters).
font-family—The font-family property is a prioritized list of font family names and/or generic family names for an element. The browser will use the first value it recognizes.
text-decoration—The text-decoration property decorates the text.
text-transform—The text-transform property controls the letters in an element.
background-color—The background-color property sets the background color of an element.
color—The color property allows authors to specify the color of an element.
display—The display property sets how/if an element is displayed.
width—The width property sets the width of an element.

The essential properties can be the only properties considered by the style application method. But there can be exceptions programmed into the OS, wherein an exception may include the styling of tab boxes in which all CSS properties explicitly set in the original page are transferred to the adapted page.

By applying these retained properties to the resulting content sections of the DOM trees during the serialize stage, a significant portion of the original's page style can be achieved. The OS can discard the layout-specific CSS properties, thereby significantly reducing the amount of data transmitted to and downloaded at the mobile device.

The first stage in the style application process extracts the essential CSS style properties from each HTML element to be included in the adapted page. Extraction can be performed during the traversal of the original DOM tree, simultaneously with JavaScript processing, flattening, etc. After initial start step 800, to begin the extraction process the OS begins extracting (802) the DOM tree structure. Upon reaching a node, the OS extracts (806) the essential computed CSS style properties from this node during the traversal of the DOM tree structure, saves the CSS style properties to a style structure, and copies the structure to this node's children nodes. The OS next determines (808) whether any nodes still need to be extracted. If so, the method proceeds to connector 804 to extract additional nodes; otherwise, the OS begins the second stage of content styling.

The second stage of content styling involves applying the appropriate style to each node. This function occurs during a serialization process (further explained below in FIG. 9) that creates actual HTML code for each content section being serialized. Style application can be performed differentially by including an HTML code imposing style when a change in style is detected. The method for applying style changes tries to incorporate the inheritance features of HTML CSS, and can be applied in the following exemplary ways:

When a change in a background color needs to be applied, the OS wraps all contiguous DOM nodes sharing the same style within a <DIV> tag thereby forcing the style change.
If background color change is not necessary, the OS uses a <SPAN> tag that forces the new style properties to wrap contiguous nodes with the same style.
Style is applied directly to each node (without using inheritance) in the following cases:
(1) the tag of the node is a h1-h6 tag;
(2) the tag of the node is an <anchor> tag being provided to an openwave browser because these tags have trouble inheriting style;
(3) the node is a preformatted node resulting from the layout preservation small screen adaptation process; or
(4) the tag of the node is a tag that cannot be directly wrapped within a <span> or <div> tag (e.g., an <option> tag).

Figure 9:
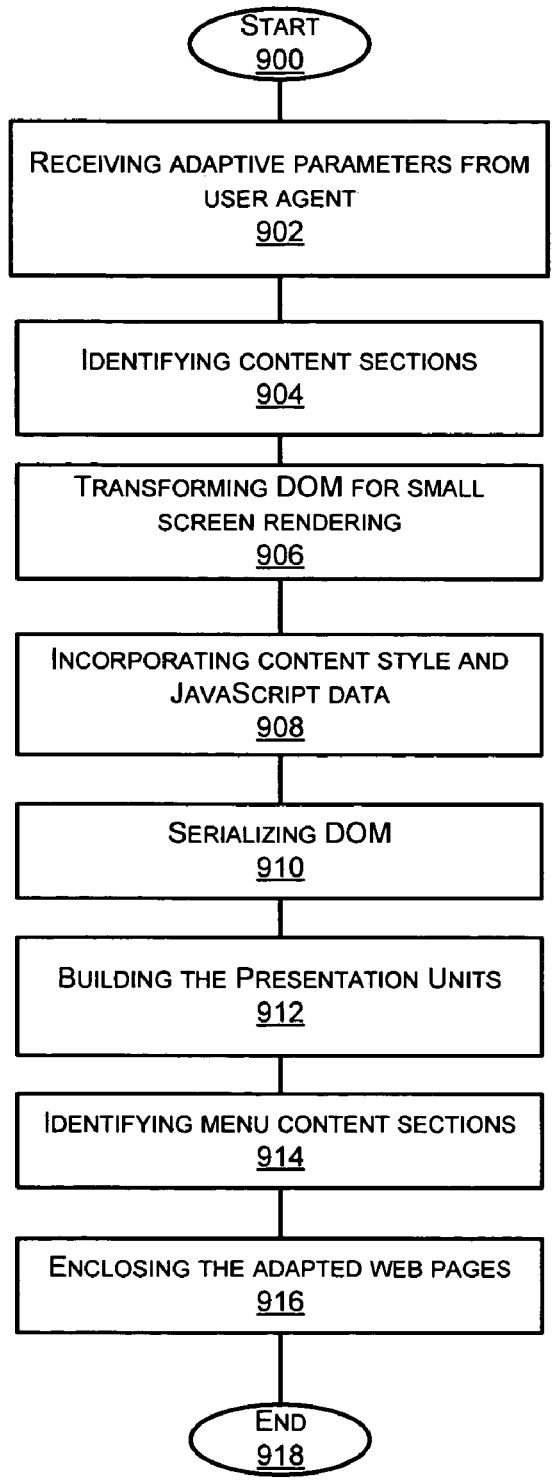
FIG. 9 is a flowchart representing the steps of an exemplary method for performing small screen adaptation of the original web page and paginating the response data.

The second stage is conducted on each of the adapted Content Section DOM trees, in a bottom-up fashion during serialize step in FIG. 9. In the particular embodiment explained in FIG. 8, the method assumes that all stored style properties for each node contain absolute style values (i.e. "background-color=blue", and therefore, in addition to the differential style application, the method includes the detection of style changes between a parent node and its children). The method can be modified to cover other cases as well. To begin the second stage, the OS selects (812) a parent node and sets the parent node's style as the variable CurrentStyle. After setting the variable, the OS determines (816) whether the parent node has any children nodes to traverse.

If the parent node has children nodes to traverse, the OS further determines (818) whether a difference exists between the CurrentStyle and the child node's style. For determining the difference, the OS specifies the style content by defining classes. One class is defined for each style property: value pair that is found necessary to be applied at some point to force a desired style change. Classes are created on demand during the serialization process as changes in style are found, and are used in enclosure tags (<div> or <span> tags) for inheritance, or applied directly as discussed above. If a difference does not exist, the OS adds (820) the child node to the list of children node that share the same style and the method proceeds through connectors 826 and 814 to determination step 816.

On the other hand, if a difference exists, OS wraps (822) the previous children nodes in an enclosure tag, sets the current child node style to CurrentStyle, and adds the current child node to a new list of children nodes. For example, the enclosure tag can be a <div> tag or a <span> tag. Then, the OS associates (824) the CurrentStyle with either a new or an existing style class. If the CurrentStyle is a new style, the OS could create a style class name; add that style value to a global index and future nodes having the same or similar styles could be added to this class name; and apply the class name to the enclosure tag. Otherwise, if this nodes style value is the same as or similar to an existing style value, this node could be added to the pre-existing class name associated with the existing style value.

If the parent node does not have any remaining children to traverse in determination step 816, the OS further determines (828) whether additional nodes remain to be enclosed or wrapped. If so, the method proceeds to connector 810 and then selection step 812; otherwise, the OS includes (830) the style values in a paginated sub-page that corresponds to the applied class name. When an adapted sub-page is constructed, all classes used to style the content sections enclosed in the sub-page are explicitly included inside the page's <style> tag. After the including step, the method can proceed to end (832).

FIG. 9 is a flowchart representing an exemplary method for transforming the original webpage into a set of sub-pages. These sub-pages bear the relevant content of the original webpage in an order that is best suited for viewing in a mobile device; are formatted to fit the small screen of a mobile device; and fit in the available memory of the mobile device. It will be readily appreciated by one of ordinary skill in the art that the illustrated procedure can be altered to delete steps or further include additional steps. After initial start step 900, the OS receives (902) adaptation parameters from a storage location. The adaptation parameters (e.g., the adaptation parameter provided in the chart above) provide information regarding the properties of a mobile device and its user agent and it helps the OS determine how to adapt the response data for transmitting it to the mobile device.

A key definition on which the present method relies is a classification of HTML elements, used to determine which action should be performed on each corresponding node in the original DOM tree. These types of classifications break into three main groups: (1) grouping elements, such as <table> or <div> tags, that impose a specific layout or structure to the content, but do not usually represent actual content; (2) ignored elements that do not provide any useful content; and (3) simple elements, such as font formatting tags, links, images, etc., that represent content or non-layout inducing markup. An exemplary classification chart is provided below in Appendix A illustrating the specific classifications for all HTML tags.

To further paginate, the OS identifies (904) sections of related content in the original DOM tree to allow advanced content manipulation. For example, menus can be moved, or content can be reordered into a more usable sequence, while preserving the logical and semantical grouping. The OS can perform identification of a content section based on statistical pattern recognition techniques to minimize the classification error. Content sections are used for arranging data that should belong together so that the adapted sub-pages maintain the look and feel of the original webpage. To identify the content sections, the OS traverses the DOM tree structure. The OS then determines (906) whether to create a content section based on the geometric information (or box model[width, height]) of a node. The geometric information of the node determines whether a content section may be created from its sub-tree. To classify a node in the DOM tree as a content section, a series of rectangles in the width x height plane (also called buckets) can be used. The first condition for considering whether a DOM node should be included in a content section is to determine whether the node fits in one of these buckets, which are described in more detail below. If a node fits in one of the content section buckets, it is likely that its sub-tree will be in the same content section bucket. During the traversal of each node of the original DOM tree, the following steps are performed for finding content sections:

- The depth first pre-order traversal of the DOM tree starts at the root—an <html> tag.
- The OS skips the current node and its sub-trees if the current node is listed in the in the ignored element list.
- The OS creates a content section for the current node if the current node is a text node, resulting in the current node being a leaf node, unless the text is filler text. Filler text can be considered decorative and otherwise useless text, like a lone pipe symbol or two colons.
- The OS skips the current node if the current node is odd shaped and is either an <image> or <iframe> tag. This classification identifies images that are used for layout as spacers, shading, ornamentation, or useless information that neither preserves the original layout of the content data nor provides content. For example, the OS can identify odd shaped elements when any of the following are true:
  (1) width in range (0,7) pixels;
  (2) height in range (0,4) pixels;
  (3) aspect ratio>5 and width<17 pixels;
  (4) aspect ratio<0.04 and height<17 pixels;
  (5) x coordinate<-width (no part of the object is rendered on the screen); and
  (6) y coordinate <-height (no part of the object is rendered on the screen).
- The OS can create a content section out of the current node if tab box processing is enabled and the current node is classified as a tabbed box (as described below).
- The OS creates a content section if the current node has been classified as a simple element.
- The OS creates a content section if the current node is a grouping element whose shape fits a content section bucket classification (as described below) or is a hidden node, which is determined through the CSS properties 'visibility' and 'display'.
- The OS can recover from misidentifications of content sections caused by the presence of nodes within the content sections that have the "float" CSS property set. For detecting this situation, the OS saves the geometry properties of the content section and compares each node's geometry to the content section's geometry during the small screen adaptation stage. A content section is considered misidentified when the dimensions of one if the node's children exceeds its own dimensions (meaning that either the child's width or height are larger than the content section's width or height).
- If detecting a misidentification, the OS can discard the originally misidentified content section and will invoke the process for finding content sections on each of children of the node originally misidentified as a content section:

If none of the above conditions are true for the current node, the OS recursively invokes the aforementioned process on each of the current node's children to determine whether any other content sections should be created.

To classify nodes as content sections according to geometric properties, the OS can compare the content section buckets to the geometric data from a node. The content section buckets are empirically adjusted beforehand to minimize the error in detecting content sections. For example, the following are exemplary content section buckets where the normalized height or width is the height or width of the node, divided by the total height or width of the page:

Small regions in width and height
    (1) Width range [26, 165]
    (2) Height range [1, 100000]
    (3) Normalized Width range [0, 10]
    (4) Normalized Height range [0.01, 0.324]
Wide, short regions (header and footer)
    (1) Width range [165, 2000]
    (2) Height range [1, 100000]
    (3) Normalized Width range [0, 10]
    (4) Normalized Height range [0.01, 0.324]
Small Boxes
    (1) Width range [26, 2000]
    (2) Height range [10, 150]
    (3) Normalized Width range [0, 10]
    (4) Normalized Height range [0, 0.01]
Columns
    (1) Width range [26, 165]
    (2) Height range [1, 100000]
    (3) Normalized Width range [0, 10]
    (4) Normalized Height range [0.324, 2]
Large Boxes
    (1) Width range [165, 331]
    (2) Height range [1, 100000]
    (3) Normalized Width range [0, 10]
    (4) Normalized Height range [0.324, 0.541]

While these exemplary content section buckets are illustrated, one of ordinary skill in the art would appreciate that any variations of this model can similarly be derived for different cases.

Tab boxes are complex HTML constructs that fully exploit JavaScript HTML visibility control. For example, cnn.com provides a tab box having two tabs: a Top Stories tab and a Most Popular tab. When a user clicks on either tab, the user gets the most recent stories corresponding to that particular tab for that particular time. Because of the tab box's complex structure, if configured to do so, the OS can recognize the tab box constructs and can provide special adaptation to preserve the tab box structures, which applies only to target devices that support JavaScript.

To recognize tab boxes, the OS first examines a parent node's one or more child nodes for a tab box structure having some visible and hidden children nodes. At least one of each should be present for the node to be considered a tab box. Next, the OS discards child elements that are not likely to represent "tabs". In some embodiments, the OS assumes that all tabs in the tab box should have a similar DOM structure such as, the number of children of each tab being the same. For elements with far more or less children than the tabs of a tab box, the OS assumes that these elements do not represent tabs and discards these elements from the decision. Finally, after considering only elements determined to be tabs, the OS can compute the ratio of visible tabs to total tabs. If the ratio is low (allowing for error in tab detection), the OS determines that the node, whose child elements are the tabs in question, is a tab box. If a tab box is identified during the process of finding content sections, a new content section is created out of it.

After identifying the content sections, the OS begins to process these content sections by adapting the resulting DOM tree fragments for displayable at the mobile device. First, the OS transforms (906) the original DOM tree structure for small screen rendering into an adapted DOM tree structure (small screen adaptation). The transformation can involve two main ways: (1) flattening content that is too wide for the mobile device's screen when rendered, and (2) preserving the layout for content that fits on the screen when rendered (e.g., the tab box identification described above, etc.).

Flattening involves fitting content that is too wide to be displayed on a mobile device's screen when rendered, and can be performed on all identified content sections. The flattening process can include deconstructing a portion of HTML that renders an area too wide for the target handset into smaller pieces. The OS can flatten the sub-tree by removing layout imposing HTML tags until: the content itself is reached (e.g., simple elements), the current node fits in the target screen, the current node is identified as a tab box, etc. The flattening process copies useful, formatted content out of the original DOM tree into a new DOM tree for each content section. Other processing, such as transcoding, JavaScript Processing, Style Extraction, etc., can be executed simultaneously while visiting each node in the content section. The following provides an exemplary flattening scheme:

The OS copies the current node to the new document tree if the current node is a text node, and it is not empty or filler text.

The OS skips the current node and its sub-tree if the current node is odd-shaped and includes either an <image> or <iframe> tag.

The OS skips the current node if the current node is on the list of ignored elements.

The OS skips the current node if the mobile device's markup language is XHTML/MP and the transcoder module indicates to skip the node.

The OS skips the current node if the current node is a <span> tag and its CSS visibility property is set to hidden.

If the current node is visible (CSS "display" property is set to 'block' and its CSS visibility property is not set to 'hidden', and coordinates are greater than zero) the OS checks the current node's geometry against the geometry of its parent to determine if the height or width of the current node is larger than its parent. If this occurs, the currently processed content section is most likely misidentified because of misleading geometry resulting from the CSS float property. The flattening process can then be aborted, and the process of finding content sections resumes as previously explained. This step relates to the process for checking cases of content section misidentification.

The OS directly copies the current node's JavaScript information and all relevant style information if the current node is a tab box. This preserves the complete look and functionality of the tab box as it would appear on the original page.

The OS copies the current node's layout configuration to the new DOM tree structure (unless the configuration disallows this in the case where the target device does not support tables) if the current node is a <td>, <table>, or <div> and its geometry is between 0 and the screen width (non-inclusive).

The OS copies the current node to the new document tree and flattens the node's children if the current node is on the list of simple elements.

The OS gives special consideration to the current node to ensure its width has been set correctly if the current node is an <input> or <select> tag.

The OS further processes the current node if the node is an HTML element and the mobile device's markup language is XHTML/MP. The OS can coerce the node to comply with XHTML/MP by adjusting the tag type or attribute list accordingly. For example the transcoder would replace a <center> tag with <div align='center'> tag.

The OS removes unneeded attributes, such as STYLE, VALIGN, ABBR, ABINDEX attributes.

The OS processes an image associated with the current node for determining the resizing information and for encoding the 'src" attribute accordingly (if the current node is an <image> or an <input> of type image).

The OS discards the current node and its sub-tree if the node is a form element without a submit button and the mobile device does not support JavaScript.

The OS further processes the current node and its sub-tree if the node is a form element with a submit button and the mobile device supports JavaScript.

The OS further flattens each of the current node's children if the node is a form element with a submit button and the mobile device supports JavaScript.

The OS further transforms the new DOM sub-tree by inserting breaks into an HTML tag. The HTML tag's CSS display property dictates whether a browser should insert a break before and after the tag when the mobile device's browser renders the HTML. In some embodiments, some CSS display property values, in conjunction with being applied to grouping tags, require breaks to be inserted before and after the grouping tags' nodes in the content section's DOM tree to best preserve the original layout. For example, a paragraph of text containing a link should not contain a break before or after the link because the link text should appear inline with the rest of the text. In some embodiments, the CSS display property values that can cause a break to be inserted are listed as follows:

Block
Table
List-item
Table-row
Table-Cell
Table-column-group
Table-row-group

Figure 11A:
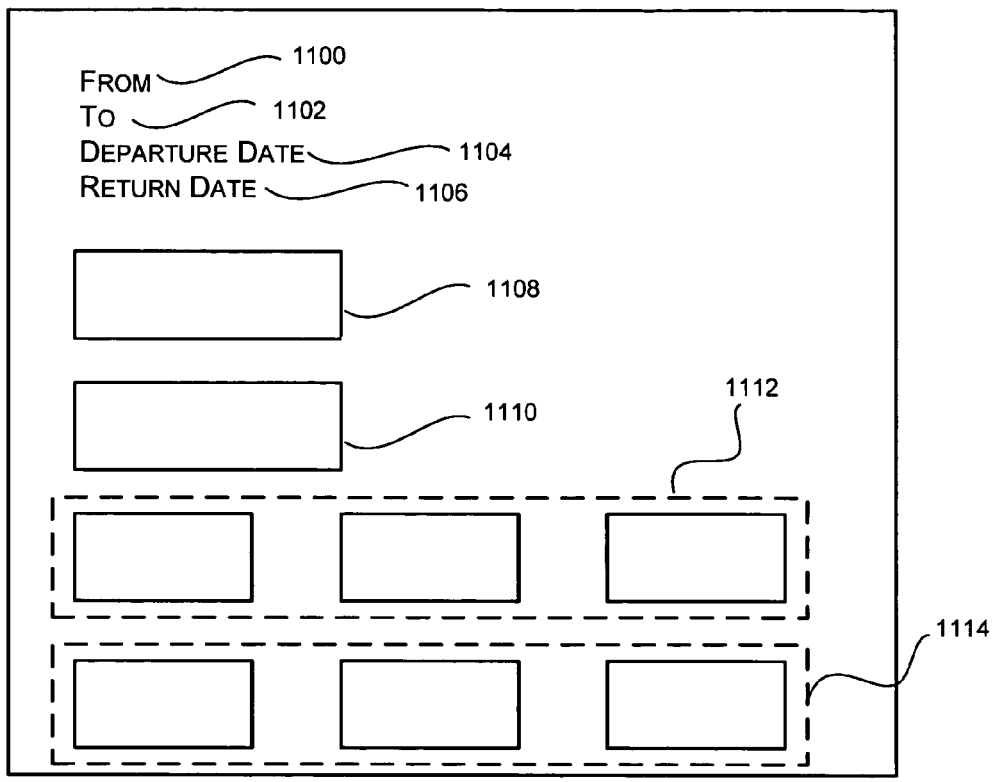
FIGS. 11A & 11B are block diagrams illustrating the exemplary effects of form processing.
Figure 11B:
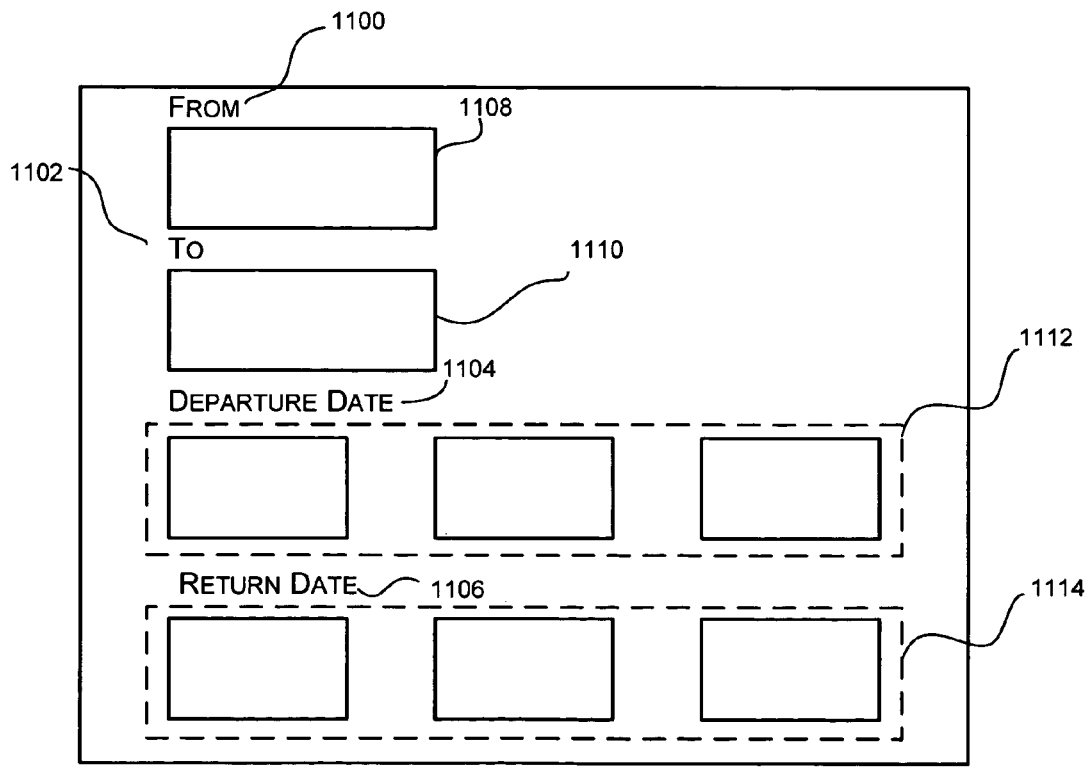

The OS further transforms the new DOM sub-tree by processing the forms found in the original DOM tree structure. The flattening process generates a sequence of simple HTML elements in document order. Often in forms, laying out HTML elements in document order can cause some difficulty matching up the text used to describe a form element, a <select> or <input> tag, and the form element itself. Copying elements in document order may result in text, text, text, followed by form element, form element, form element. This will confuse the user about which text label corresponds to which form element. For example, FIG. 11A illustrates how a mobile device may render form data. For example, form labels FROM 1100, TO 1102, DEPARTURE DATE 1104, and RETURN DATE 1106 do not match up with their corresponding form elements 1108, 1110, 1112, and 1114, respectively. The purpose of form processing is to match up the form labels with their corresponding form elements, as shown in FIG. 11B.

Figure 10:
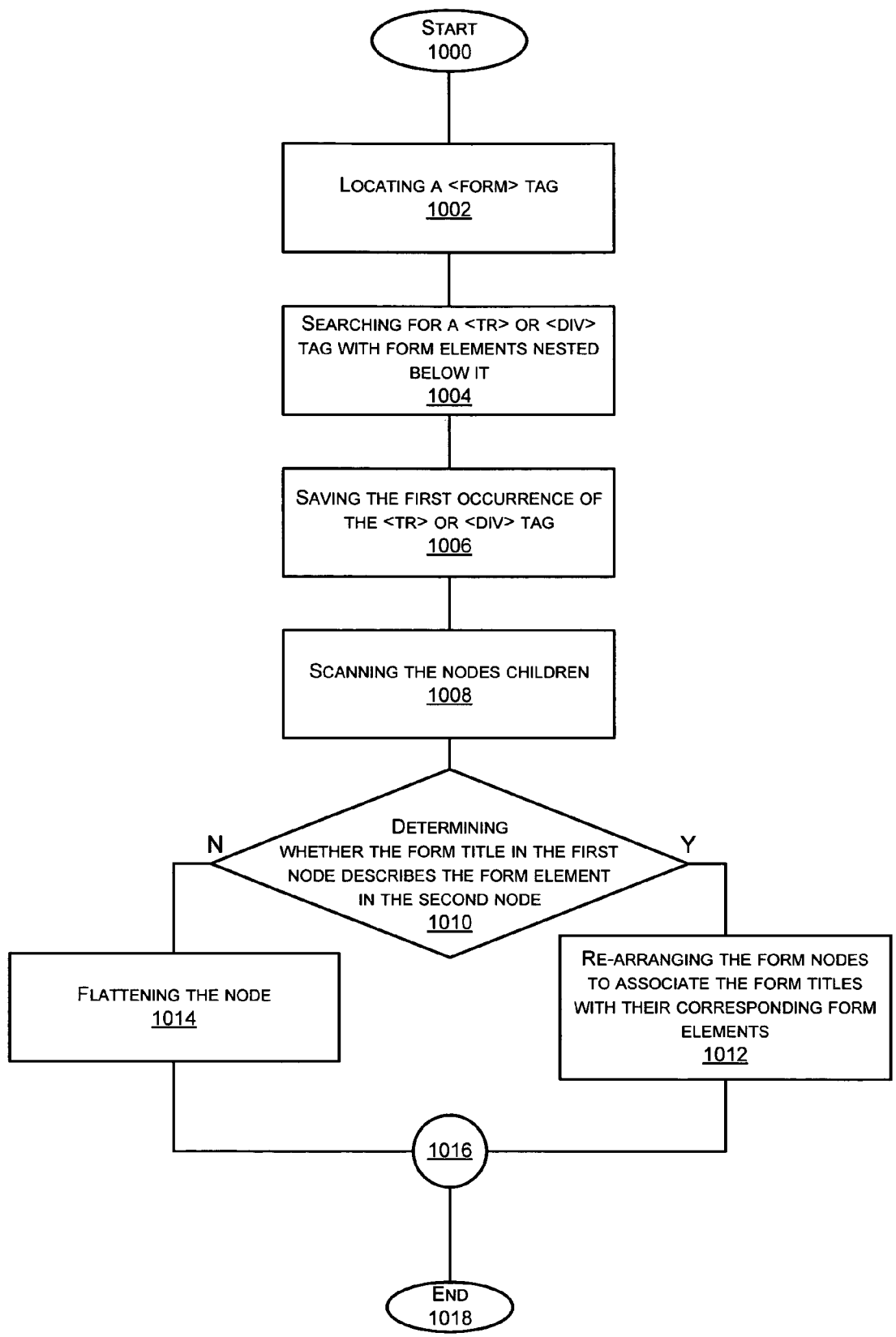
FIG. 10 is a flowchart representing the steps of an exemplary method for performing form processing.

FIG. 10 is a flowchart representing an exemplary method for performing form processing. It will be readily appreciated by one of ordinary skill in the art that the illustrated procedure can be altered to delete steps or further include additional steps. After initial start step 1000, the OS locates (1002) a <form> tag during the flattening process thereby triggering the form processing on the <form> tag's sub-tree.

After locating a <form> tag, the OS can search (1004) within the <form> tag for a <tr> or <div> tag with at least two form elements nested underneath it. When the OS locates that instance of a <tr> or <div> tag, the OS saves (1006) the position of the previous occurrence of the <tr> or <div> tag and flattens everything up to that position. At this point, the OS has isolated two nodes whereby the first node's sub-tree might contain text nodes that correspond with the second nodes sub-tree's form elements.

The OS can then attempt to rearrange the sub-trees of the two nodes so that the form labels can be associated with their corresponding form elements. Before the rearranging occurs, the OS scans (1008) the first node's children to determine (1010) whether the form label exists in the first node that describes the form elements in the second node. If the OS finds another form element at the same level as the form label in the first node's sub-tree or finds nothing, the re-arranging will not occur and the OS will continue flattening (1014) the node of the DOM tree structure. The method will proceed to connector 1016 and then end (1018).

On the other hand, if the OS locates a <label> tag or finds text contained inside of a cell of the <tr> or <div> tag, the OS can rearrange (1012) the nodes so that the form labels will correspond with their form elements. This re-arrangement occurs by the OS taking the sub-tree of each of the first node's children, having the form label, that qualify to be rearranged and appending these children to a fakeroot. This fakeroot's children are then interlaced within the second node's children that contain form elements so that the form labels are correctly associated with the form elements as shown in FIG. 11B. After the re-arranging, the method will proceed to connector 1016 and then end (1018).

Referring back to transformation step (906) in FIG. 9, in some embodiments, flattening can be unnecessary because a webpage designer has laid out the into an area that is small enough for the mobile device's screen size. In this case, a layout preservation function copies the sub-tree representing the small section, including the grouping and layout tags, to preserve the original designer's layout.

During DOM traversal, for any <div>, <td>, or <table> tag whose dimensions fit within the screen width, the layout is preserved and the OS copies the sub-tree corresponding to these tags as-is. In some embodiments, some conditions may invalidate a node's sub-tree; hence, allowing the flattening to continue on that originally discovered node. Also, the layout preservation function performs much of the same functionality checks that are provided in the flattening process because both functions are trying to filter the tags before adding them to the content section's adapted DOM tree. For example, the layout preservation function can perform the following checks and error conditions:

If necessary, the OS performs transcoding on a node by node basis.

The OS can include <Input> or <Select> tags that are not included inside of forms if JavaScript is supported on the device.

The OS can ensure that a form has some way of submitting itself to a mobile device that does not support JavaScript; otherwise, the layout preservation function does not preserve the layout of this sub-tree.

The OS ignores odd shaped images and iframes.

The OS ignores hidden <span> tags.

The OS can invalidate a float element if the float element is found because its dimensions are probably incorrect.

The OS replaces a <td> tag with a <div> tag if a root node includes a <td> tag because the flattening process has removed the parent table tag and the layout preservation function the adapted DOM tree structure cannot have floating <td> tag in an output HTM.

Some browsers (specifically NetFront) may have problems rendering <div> tags with small dimensions (e.g., less than 20 pixels). These problems occur when small <td> tags are replaced with <div> tags (i.e. www.cnn.com). To remedy this, the OS can insert a <br> tag before appending the new <div> tag.

The OS can modify and include filler text. For example, spacer text, a form of filler test, can be used by a mobile device's browser for layout information. The OS can replace the filler text with a single space prior to removing all filler text.

The OS can promote Lowsrc attributes values to src attribute values.

The OS can set a flag "preFormat" (used for style) for each node added to the adapted DOM tree. If a node is created using the layout preservation function (preFormat flag set), the node's class and <id> tag are left intact so that JavaScripts, that reference them, may still function properly.

Regarding the processing of a tab box, when locating a tab box, the OS copies the entire DOM sub-tree and all of its CSS style properties explicitly set in the sub-tree and applies them to the adapted DOM tree structure to achieve an exact replica of the original layout.

While transforming the original DOM tree structure into a new, small screen adapted DOM tree structures, the OS performs (908) the JavaScript processing in FIG. 7 and the content styling performed in FIG. 8, collecting all JavaScript and style data required to assemble the final HTML page(s). The OS can then serialize (910) the adapted tree structure by transforming it into HTML text. As noted above, a content section may exceed the limitations of the target mobile device (i.e. memory, number of links, etc). Therefore, if it is determined within serialization that the resulting page will break a device limit, the OS can break the content section into multiple presentation units. In a truly flattened tree, it can be very difficult for the OS to determine where to insert a presentation unit division between two simple elements. Instead of true flattening, the OS can copy a sub-tree representing a content section directly from the original DOM sub-tree to the adapted DOM tree structure to preserve the original sub-tree's structure, and can mark all grouping elements as transparent nodes. Transparent nodes assist in retaining the original grouping of simple elements and assist the serialization process. Serialization is performed bottom-up, and fails when any of the device limits are exceeded (determined by counters for bytes, # of images, etc). When the serialize function fails on the root of the content section, the OS then attempts to recursively create a presentation unit for the sub-tree that begins at each of the root's children. As each presentation unit is created, the OS caches these presentation units in the nodes themselves so future invocations of the serialize function will not perform traversals deeper into the tree. When the sub-tree of a simple element exceeds the device limits (i.e. a large paragraph of plain text), the serialization function breaks the simple element into multiple presentation units and re-serializes them.

Once the list of content sections have been created and each content section contains a list of one or more presentation unit (each being smaller than the maximum page size), the OS can construct the actual sub-pages. To begin constructing the sub-pages, the OS can construct (912) one or more adapted sub-pages. The construct function populates the final page list with newly created presentation units by traversing all content section's presentation units one at a time. By looping through all presentation units of all content sections, the construct function determines whether each presentation unit should go on the current sub-page or whether a new sub-page should be started so that the generated sub-pages comply with the mobile device's limitations. For example, the determination can be based on the following characteristics:

Adding the presentation unit to the current sub-page if the sub-page's size is 0.

Starting a new page if adding to the current sub-page would exceed any limit of the device.

Adding the presentation unit to the current sub-page if the page's byte count is still under the minimum "preferred" byte size (prevents tiny pages except at the end).

Adding the presentation unit to the current sub-page if it is the last presentation unit (sometimes prevents small final pages).

Optimizing the current page's byte size towards the average byte size (bytes left/preferred pages left) by starting a new page if the current one already exceeds the average, or if adding the presentation units to this page would exceed the average more than the current deficiency of presentation units.

Adding the presentation unit to the current sub-page if a preferred number of pages have already been exceeded.

Adding the presentation unit to the current sub-page if none of the above conditions apply.

Because the content styling has already been applied in the presentation unit's outer-most <div> tag, the build pages process can add the HTML generated by the serialization function to put one or more sub-pages together. A presentation unit includes information concerning its respective content styling classes and JavaScript. When multiple presentation units are combined into a sub-page, the respective content styling classes and JavaScript are also combined into that sub-page. The construct function also extracts each menu content section out of the main page sequence and creates a new sub-page sequence for these extracted sections.

After constructing the sub-pages, the OS identifies (914) menu content sections and moves these menu content sections out of the main browsing path to a separate browsing path. This prevents large sections of links from taking up the first few pages in a sub-page sequence. For example, espn-.go.com provides a menu that is small in size for the browser but extremely long when displayed in single-column format on a device. The construction function can insert a menu link into the DOM tree where the menu content section was extracted from. In some embodiments, the construction function can replace a section having hundreds of links with a single link to the new page list; thereby allowing the presentation unit to retain all of its original content and allowing the user to skip browsing through excessive pages of menus to get to the main content.

To identify these menu content sections, the OS calculates a menu score on all content sections on the list for determining whether a content section is a menu content section. A score is produced from multiple statistics collected about the content section during flattening and serialization and if the score exceeds a threshold, the OS classifies this content section as a menu and moves this content section to a new sub-page. For example, the menu score can be based on the following:

The menu score can be proportional to the link density, which is the number of links divided by the area of the content section.
  The menu score can be proportional to the placement of the content section relating to the document order. Sections near the beginning of the document are classified as menus more aggressively because menus at the beginning of the adapted sub-page can hinder the user's experience.
  The menu score can be increased if determined that the URL of the original document does not look like the URL of a homepage. This makes menu classification more aggressive on pages where navigational links are less important that content.
  The menu score can be proportional to the number of links in the content section because having more links indicates a likelihood that the content section is a menu.
  The menu score can be increased if the links within the content section refer to pages whose URLs do not look like the URL of a homepage.
  The menu score can be decreased if the content section includes more text than link bytes. Long text links are less likely to be a menu because they are more likely related to the page's content.

If the menu score of a content section exceeds a predetermined threshold, the OS shall classify the content section as a menu content section and move this section back to a later sub-page.

After distinguishing between the menu and non-menu content sections, the OS encloses (916) the sub-pages with a header and footer when appropriate. The header and/or footer allow a user to navigate through the sub-pages within a sub-page sequence. The enclose function involves adding the appropriate header and doctype; writing the <head> tag (which includes CSS classes and scripts that are used in the page) into the sub-page's HTML buffer; and creating a navigational header and footer for the user. In some embodiments, the adapted main sub-page and/or the subsequent sub-pages may not include a header. Further, the header and/or footer can include, among other things, links to nearby sub-pages, links to sub-pages that are multiples of 10 away from the present sub-page, and links to the first and last sub-page. For example, the link can be a page number, an image, or a name of the sub-page. In some embodiments, links to the previous and next sub-page contain soft key attributes. Further, in some embodiments, the footer may include an anchor with a soft key. The footer may also include a static description of any enabled soft keys.

For a menu sub-page, the header and footer can be exactly the same. If the menu fits in a single page, the header and footer may only have a link to return to the place the menu was extracted from in the main sequence; otherwise, Prev and Next links can be included when there is a previous or next menu sub-page. After the sub-pages have been enclosed, the method can end (918).

In some embodiments, to improve the usability of the resulting pages on small screen devices and minimize the byte count, it may be desirable to resize large images. The pagination function can prepare images for resizing by gathering geometric data and calculating the necessary resizing factor. Because the pagination engine already has information about the size of the target device's screen and has access to the geometric information of an image when it is rendered on the screen, the pagination engine is well suited to perform this calculation. When receiving the original image URL, the OS can calculate an appropriate image size and resize it accordingly.

In some embodiments, before content adaptation is performed, there are some HTML responses (e.g., HTML redirects, etc.) that should not be adapted. Some websites send back HTML responses that redirect a user to a different website rather than using the HTTP for redirects. These websites often include this redirect information in the original document's meta tag, but this information could be stripped out by the pagination engine thereby creating a blank page that would not redirect to the intended page. To avoid this, a mechanism could be provided into the content adaptation engine to scan the document's meta tag for "HTTP-EQUIV='Refresh' content=' '" with the "content=" having a very low timeout and a URL. If this is found, the page can be transcoded and returned. Now, the mobile device can receive an HTML page capable of redirecting to the intended page.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

APPENDIX A

| HTML Tag Name | Classification |
| --- | --- |
| a | simple |
| abbr | simple |
| acronym | simple |
| address | simple |
| align | grouping |
| applet | ignored |
| area | ignored |
| b | grouping |
| base | ignored |
| basefont | ignored |
| bdo | simple |
| bgsound | ignored |
| big | simple |
| blink | grouping |
| blockquote | grouping |
| body | grouping |
| br | simple |
| button | simple |
| caption | simple |
| center | grouping |
| cite | simple |
| code | simple |
| col | grouping |

APPENDIX A-continued

| HTML Tag Name | Classification |
|---|---|
| colgroup | grouping |
| comment | grouping |
| dd | simple |
| del | simple |
| dfn | simple |
| dir | grouping |
| div | grouping |
| dl | grouping |
| dt | simple |
| em | grouping |
| embed | ignored |
| fieldset | grouping |
| font | grouping |
| form | simple |
| frame | grouping |
| frameset | grouping |
| h1 | simple |
| h2 | simple |
| h3 | simple |
| h4 | simple |
| h5 | simple |
| h6 | simple |
| head | ignored |
| hr | simple |
| html | grouping |
| i | simple |
| iframe | grouping |
| ilayer | grouping |
| img | simple |
| input | simple |
| ins | simple |
| isindex | simple |
| kbd | simple |
| keygen | ignored |
| label | simple |
| layer | ignored |
| legend | ignored |
| li | grouping |
| link | simple |
| listing | grouping |
| map | ignored |
| marquee | grouping |
| menu | grouping |
| meta | ignored |
| multicol | grouping |
| nobr | grouping |
| noembed | ignored |
| noframes | ignored |
| nolayer | ignored |
| nosave | ignored |
| noscript | ignored |
| object | ignored |
| ol | grouping |
| optgroup | simple |
| option | simple |
| p | grouping |
| param | ignored |
| plaintext | simple |
| pre | simple |
| q | simple |
| rb | ignored |
| rbc | ignored |
| rp | ignored |
| rt | ignored |
| rtc | ignored |
| ruby | ignored |
| s | simple |
| samp | simple |
| script | ignored |
| select | simple |
| server | ignored |
| servlet | ignored |
| small | ignored |
| spacer | grouping |
| span | grouping |
| strike | simple |
| strong | grouping |
| style | ignored |

APPENDIX A-continued

| HTML Tag Name | Classification |
|---|---|
| sub | simple |
| sup | simple |
| table | grouping |
| tbody | grouping |
| td | grouping |
| textarea | grouping |
| tfoot | grouping |
| th | grouping |
| thead | grouping |
| title | simple |
| tr | false, |
| tt | simple |
| u | simple |
| ul | grouping |
| var | simple |
| wbr | grouping |
| xmp | simple |

What is claimed is:

1. A system comprising:
an optimization server configured
to receive from a content server response data that corresponds to request data transmitted by a mobile device, wherein:
the request data includes a request for the response data and identification data of the mobile device,
to adapt the response data to the mobile device based on the identification data, and
to transmit the adapted response data to the mobile device,
wherein the adapted response data is based on the optimization server extracting a first global JavaScript object from a data structure and
an associated JavaScript file to a global object map, wherein:
the data structure and the associated JavaScript file represent the response data,
executing, without invocation from the mobile device, JavaScript functions to be executed by the mobile device upon receiving and loading the response data, wherein:
the execution updates the data structure,
determining whether a node of the updated data structure includes an attribute whose value is associated with the first global JavaScript object to be included in the adapted response data,
parsing the attribute value for any reference to the first global JavaScript object based on the determination,
creating a dependency set for the first global JavaScript object based on the parsing, wherein:
the dependency set provides a second global JavaScript object on which the first global JavaScript object relies,
decompiling the first global JavaScript object of the dependency set and the second global JavaScript object into source code, and
constructing a final JavaScript source code based on the decompilation.

2. The system of claim 1, wherein the optimization server does not include a source code referring to the executed JavaScript functions in the final JavaScript source code.

3. A method for JavaScript processing, the method comprising:
extracting a first global JavaScript object from a data structure and an associated JavaScript file t a global object map, wherein:

the data structure and the associated JavaScript file represent response data;
executing, without invocation from the mobile device, JavaScript functions to be executed by the mobile device upon receiving and loading the response data, wherein:
the execution updates the data structure,
determining whether a node of the updated data structure includes an attribute whose value is associated with the first global JavaScript object to be included in the adapted response data;
parsing the attribute value for any reference to the first global JavaScript object based on the determination;
creating a dependency set for the first global JavaScript object based on the parsing, wherein:
the dependency set provides a second global JavaScript object on which the first global JavaScript object relies during the execution of the JavaScript functions;
decompiling the first global JavaScript object of the dependency set and the second global JavaScript object into source code; and
constructing a final JavaScript source code based on the decompilation.

4. The method of claim 3, wherein extracting the JavaScript object involves extracting a particular JavaScript object, wherein the particular JavaScript object is related to either a form or a tab box.

5. The method of claim 4, further comprising determining whether a JavaScript object is a particular JavaScript object if the element of the node is a descendent of a form node, the element is from a form element, or the element is within a tab box content section.

6. The method of claim 3, wherein creating the dependency set includes:
parsing the attributes value for any JavaScript code,
tokenizing the JavaScript code for any additional identifiers,
extracting a list of any additional identifiers that match the JavaScript object in the global object map,
updating the dependency set with the matched identifiers,
decompiling the matched JavaScript object into source code, and
further tokenizing the source code for other references to global objects so that the dependency set is complete.

7. The method of claim 3, wherein the final JavaScript source code does not include a source code referring to the executed JavaScript functions.

8. A tangible computer-readable medium storing instructions that, when executed by a computer, cause the computer to perform a method of JavaScript processing for adapting response data for a mobile device, the method comprising:
extracting a first global JavaScript object from a data structure and an associated JavaScript file to a global object map, wherein the data structure and the associated JavaScript file represent the response data;
executing, without invocation from the mobile device, JavaScript functions to be executed by the mobile device upon receiving and loading the response data, wherein:
the execution updates the data structure,
determining whether a node of the updated data structure includes an attribute whose value is associated with the first global JavaScript object to be included in the adapted response data;
parsing the attribute value for any reference to the first global JavaScript object based on the determination;
creating a dependency set for the first global JavaScript object based on the parsing, wherein the dependency set provides a second global JavaScript object on which the first global JavaScript object relies during the execution of the JavaScript functions;
decompiling the first global JavaScript object of the dependency set and the second global JavaScript object into source code; and
constructing a final JavaScript source code base on the decompilation, wherein:
the final JavaScript source code does not include the executed JavaScript functions.

9. A tangible serving device comprising:
a response monitor that receives response data from a content server and an adaptor that adapts the response data based on the properties of a mobile device, wherein the adapted response data is provided to a mobile device for downloading,
wherein the adaptor adapts the response data by JavaScript processing, which comprises:
extracting a first global JavaScript object from a data structure and an associated JavaScript file to a global object map, wherein the data structure and the associated JavaScript file represent the response data;
executing, without invocation from the mobile device, JavaScript functions to be executed by the mobile device upon receiving and loading the response data, wherein:
the execution updates the data structure,
determining whether a node of the updated data structure includes an attribute whose value is associated with the first global JavaScript object to be included in the adapted response data;
parsing the attribute value for any reference to the first global JavaScript object based on the determination;
creating a dependency set for the first global JavaScript object based on the parsing, wherein the dependency set provides a second global JavaScript objects on which the first global JavaScript object relies during the execution of the JavaScript functions;
decompiling the first global JavaScript object of the dependency set and the second global JavaScript object into source code; and
constructing a final JavaScript source code based on the decompilation.

10. The tangible serving device of claim 9, wherein the adaptor does not include a source code referring to the executed JavaScript functions in the final JavaScript source code.

* * * * *